(12) United States Patent
Murakami et al.

(10) Patent No.: US 6,542,982 B2
(45) Date of Patent: *Apr. 1, 2003

(54) DATA PROCESSER AND DATA PROCESSING SYSTEM

(75) Inventors: Yasuyuki Murakami, Hachioji (JP); Shigezumi Matsui, Kodaira (JP); Kunihiko Nishiyama, Akishima (JP); Atsushi Kiuchi, Higashimurayama (JP); Yuichi Takitsune, Koganei (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/783,551

(22) Filed: Feb. 15, 2001

(65) Prior Publication Data

US 2002/0120829 A1 Aug. 29, 2002

(30) Foreign Application Priority Data

Feb. 24, 2000 (JP) ........................................ 2000-052245

(51) Int. Cl.[7] .................................................. G06F 9/40
(52) U.S. Cl. ........................ 712/207; 711/119; 711/120; 712/205; 712/241
(58) Field of Search ............................... 712/205, 207, 712/241; 711/119, 120

(56) References Cited

U.S. PATENT DOCUMENTS

| 5,511,178 | A | | 4/1996 | Takeda et al. .............. 711/125 |
| 5,680,564 | A | * | 10/1997 | Divivier et al. ............. 712/205 |
| 5,828,860 | A | * | 10/1998 | Miyaoku et al. ............. 712/207 |
| 5,845,101 | A | * | 12/1998 | Johnson et al. ............. 712/207 |

FOREIGN PATENT DOCUMENTS

JP    4-62637    2/1992

* cited by examiner

*Primary Examiner*—Kenneth S. Kim
(74) *Attorney, Agent, or Firm*—Miles & Stockbridge P.C.

(57) ABSTRACT

In order to simplify the instruction prefetch architecture for use with the programs having few loops, and having instructions almost in linear and sequential addresses, the bus controller in accordance with the present invention for controlling the bus in an external memory includes a plurality of instruction buffers, flags each specific to each of instruction buffers, and a buffer controller circuit. The buffer controller circuit may allocate one of specific values that plural lower bits of an instruction address may take to each of the instruction buffers, and prefetch instructions to the instruction buffers each corresponding to a respective addresses designated to by the plural lower bits, from the address following a predetermined fetch address. The constitution for instruction prefetch as above may be implemented in a simpler manner than the controlling structure using address tags of a cache memory or the controlling structure using read-write pointer based on the counter in FIFO buffers.

22 Claims, 23 Drawing Sheets

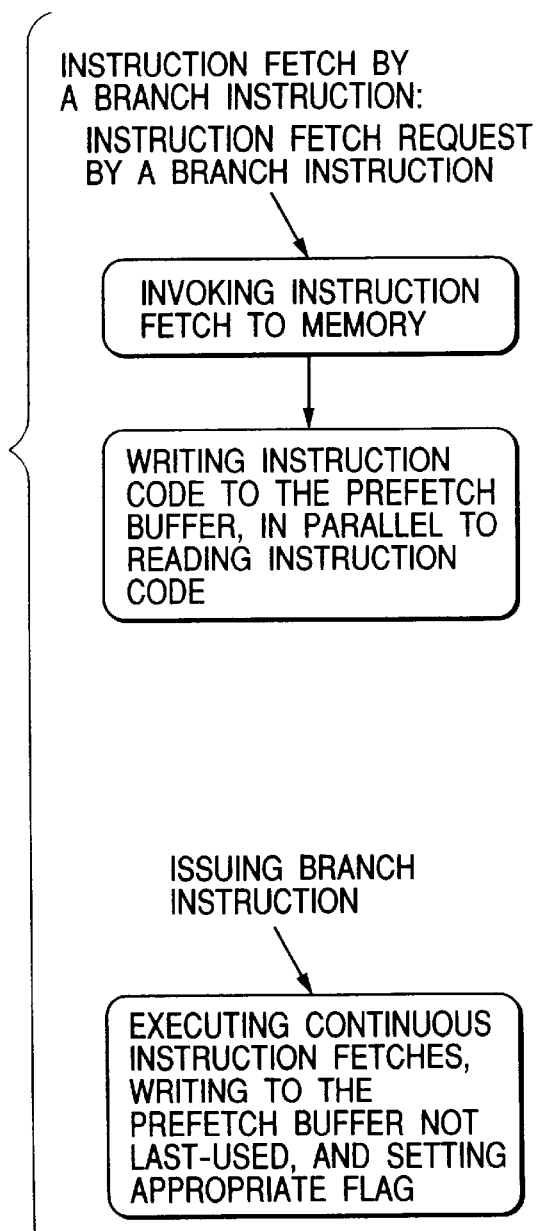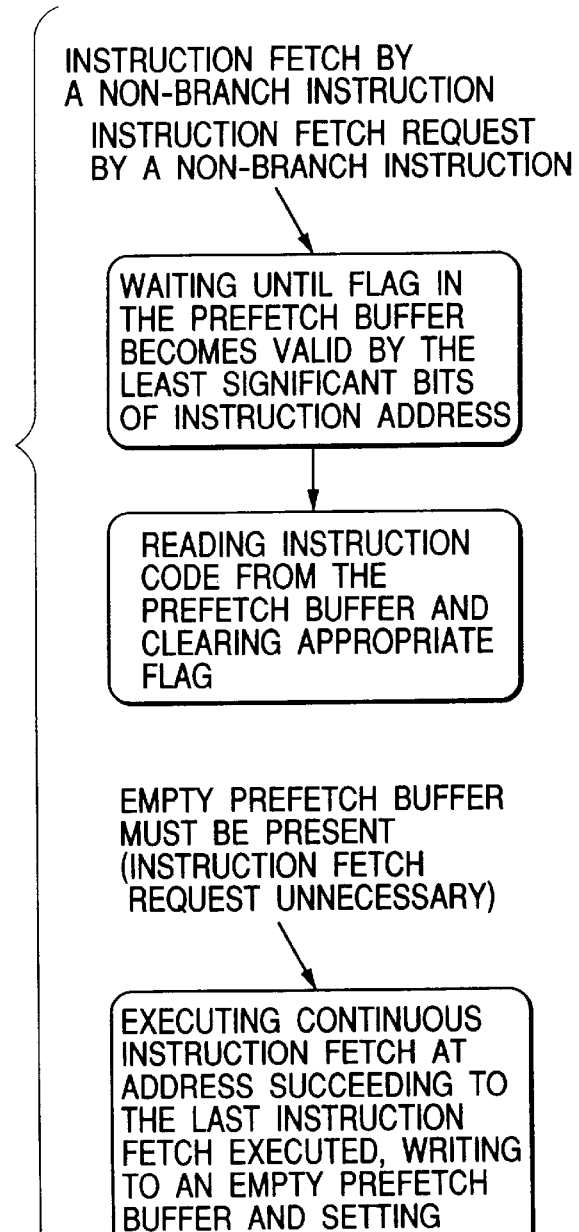
FIG. 17(A)
FIG. 17(B)

DATA PROCESSER AND DATA PROCESSING SYSTEM

BACKGROUND OF THE INVENTION

The present invention relates to a data processor and a data processing system, and more particularly to a data processing system, which may provide an improved facility for prefetching instructions from an external memory, thereby performing subroutine programs involving fewer branches (including jump instructions) representing the alteration of execution sequence of successive instruction addresses.

There are known instruction cache memories and instruction prefetch buffers embodying conventional techniques for accelerating the speed of consecutive instruction execution in a data processor or the like. Such acceleration techniques take advantage of localities of data to be referenced in the temporal and spatial domains.

As an example, Japanese Published Unexamined Patent Application No. Hei 6 (1994)-243036 (U.S. Pat. No. 5,511, 178) discloses a technique concerning a loop lock, which points out to the locality of fetched instructions. According to the disclosed technique, a sequence of instructions in the loop is retained in a cache memory until the program control exits from the loop.

Japanese Published Unexamined Patent Application No. Hei 4(1992)-62637 discloses a microprocessor including instruction queues (instruction prefetch buffers) that may store fetched loop instructions in an FIFO (first-in first-out) buffer in order to improve the execution speed.

SUMMARY OF THE INVENTION

Techniques such as those mentioned above may be effective in processes using many loop instructions since the loop instructions are held in a cache memory or an instruction prefetch buffer for accelerating the execution of sequential instructions. In processes including few loop instructions but sequential execution of almost linear and consecutive addresses, however, the conventional techniques may not be as effective even with some measures taken to prevent any loop instructions from being purged from the buffer or memory. In such cases, the inventors of the present invention have found that even the use of a regular instruction cache memory would have practically no significance.

More specifically, the inventors have studied the execution of subroutine programs such as those for protocol handling or system control processing in a cellular phone system. The protocol processing or system control processing by subroutine programs can be a complicated process, and may become large, storing every necessary processing programs in an internal ROM of a data processor may not be a practical solution. On the other hand, the access speed of external memory is slower than the speed of data processing in a data processor. The discrepancy of speed may be compensated for by use of an instruction cache memory in the data processor. However, the above protocol handling or system control processing frequently uses sequential execution of instructions having their addresses arranged in substantially linear and consecutive, and few loop instructions are included. As a result, not much advantageous effect may be expected from the introduction of a cache memory arrangement.

Under such circumstances, the inventors have decided to exclude the cache memory and utilize instead an instruction prefetch arrangement that is relatively simple in structure. In that case, there is no need for a structure to prohibit the overtaking of any loop instruction given the fact that the processing of interest mostly involves sequential execution of instructions having their addresses arranged in substantially linear and consecutive manner with few loop instructions included. From the standpoint of cost-performance, it was found that the correspondence between prefetched instructions and their addresses needed to be ensured in an appreciably simpler manner when compared with a cache memory address tag control feature or a counter-based read/write pointer control feature.

The inventors have further studied on the instruction prefetching and discovered that, when using a fixed-length burst transfer feature, any invalid instructions were also prefetched if a branch by a branching instruction is encountered, thereby overheads would be resulted in.

The inventors have also found that, when the instruction prefetching was performed by a branch to be executed or a conventional instruction fetch request in combination with lower plural bits, the execution of program would be suspended until instruction fetch from the external memory in the following instruction prefetch would be completed in tha case where all prefetched instruction are executed.

When studying deeply the access to the external memory, instruction prefetch is effective for capturing instruction codes (instructions fetch). However, the external memory will be accessed when capturing data described as operands (data fetch), and we have found that the execution of program would be suspended until all data would be fetched from the external memory.

The inventors have studied a countermeasure by refining the scheme of instruction prefetch with regard to those problems discovered when prefetching instructions. In those circumstances, the correspondence between the instruction prefetched and the address of that instruction should be more simplified than the control feature using address tag of the cache memory or the control mechanism for read-write pointers, from the standpoint of cost-performance.

It is therefore an object of the present invention to provide a data processor of a relatively simple structure, capable of prefetching instructions from the outside in order to improve the efficiency of instruction execution.

It is another object of the present invention to provide a data processing system having an instruction prefetch facility of a relatively simple structure in a data processor, so as to accelerate the processing, whereby sequential execution of instructions of linear or consecutive addresses with few loop instructions are fetched from an external memory and executed.

It is a further object of the present invention to provide a data processing system that executes subroutine programs including few branch processes requiring modification of the order in the execution sequence of successive instruction addresses, thereby offering efficient data processing at relatively lower costs.

Major features of the present invention disclosed herein will now be overviewed herein below.

A data processor in accordance with the present invention comprises an instruction executing means which may fetch instructions and decode thus fetched instructions to execute thus fetched and decoded instructions; and a bus controller which may control access to an external bus in accordance with commands from the instruction executing means. The bus controller may include a plurality of instruction buffers, a flag intrinsic to each of the instruction buffers, and a buffer control circuit. The buffer control circuit may allocate to each of the instruction buffers one of intrinsic values that a plurality of lower bits in each instruction address may have; the circuit may prefetch instructions into the instruction buffers corresponding to the order of instruction addresses, each of which are expressed by the lower plural bits and are next to the address of a fetched instruction of interest; and validate the flag of any instruction buffer when an instruction is prefetched into that buffer while making the flag of any instruction buffer invalid in response to output of a prefetched instruction from that buffer.

With the above structure, prefetching instructions into the instruction buffers need only to be done when any one of the values each expressed by the lower plural bits in an instruction address has reached a predetermined value. Illustratively, in order to simplify measures of instruction prefetch control, when an instruction having a starting offset address expressed by the lower plural bits is fetched, some instructions may be prefetched into the instruction buffers corresponding to the addresses in the range from the one next to the starting offset address to the final instruction address expressed by the lower plural bits. Assuming that a branch instruction can occur changing the order of instruction addresses in the sequence, if a branch destination instruction is fetched using a branch instruction, then instructions may be prefetched into the instruction buffers corresponding to the addresses in the range from the one next to the address of the fetched branch destination instruction to the final instruction address expressed by the lower plural bits.

A data processing system utilizing the inventive data processor above may have a memory apart from the data processor. The memory may store operation programs performed by the data processor and is an object of external bus access thereby.

The memory above may contain a program using a number of processes that require sequential execution of instructions with their addresses arranged in a linear, consecutive manner, with few loop instructions included. Not much advantageous effect on the performance can be thus expected from the use of a cache memory in the data processor that executes such programs.

By using the data processor with the means as have been described above in accordance with the invention, a value expressed by lower plural bits in an instruction prefetched from an external source may uniquely determine to which instruction buffer the instruction is directed. This simplifies prefetch control. An architecture for implementing such instruction prefetch may be embodied much more simpler than the control feature using address tags for a cache memory and the control feature of read/write pointers using a counter for the FIFO buffer.

In addition to the above, the flag status will be controlled to be valid if an instruction is prefetched from an allocated address into a given instruction buffer associated therewith, or otherwise to be invalid in response to the output of a prefetched instruction from an instruction buffer. A valid flag thus indicates that a buffer entry is valid, which can be fetched from the corresponding buffer, while on the other hand an invalid flag indicates that the buffer entry is invalid, allowing a newly prefetched instruction to be loaded into the buffer in question.

When using the above measures, under the condition that there is detected a valid flag associated with the instruction buffer to which is allocated the value expressed by the lower plural bits in the address of the instruction to be fetched by the instruction executing means, the buffer control circuit may output the instruction from the corresponding instruction buffer to the instruction executing means. If otherwise detected is an invalid flag, then the buffer control circuit may permit the prefetch of an instruction into the instruction buffer corresponding to that flag.

By considering the occurrence of processes such as a branch that changes the order of execution sequence of instructions in consecutive addresses, the buffer control circuit may initialize all flags to mark invalid status if the instruction executing means indicates a change of the order of execution of instructions in the consecutive addresses of instructions.

If each of the instruction buffers is arranged so as to have the number of bits equal to the instruction fetches performed by the instruction executing means, it will become easier to control the instruction fetches from the instruction buffers by the instruction executing means.

When prefetching an instruction into the instruction buffer, the offset address of prefetching on the basis of information stored in a register and the like may be determined, instead of prefetching up to the offset address based on the plurality of lower bits in the instruction address, or the offset address of prefetching on the basis of the frequency of occurrence of branches and the like. The number of invalid instructions can be controlled thereby when prefetching according to a branch instruction.

The instruction prefetch may stop by triggering by the occurrence of an interrupt, in addition to a branch. This is because when an interrupt occurs, the execution of program will be halted as needed in order to execute the interrupt program. Thus, the instructions already prefetched will be discarded.

At least two units of instruction buffers will be provided, where one unit includes the plurality of instruction buffers. While executing by means of the instruction executing means instructions prefetched to each of instruction buffers of the primary unit (instruction buffers in the first buffer table), the buffer control circuit may prefetch the instruction in the instruction address next to the last instruction address in the instruction buffer of the first unit to the instruction buffers of the second unit (instruction buffer in the second buffer table). The instructions will be executed during the instruction prefetch from an external memory to an instruction buffer without interrupt of the execution of the program, by controlling by the instruction execution means the execution of instructions prefetched to the instruction buffer of the second unit after the execution of instructions prefetched in the instruction buffer of the first unit is completed.

It may be preferable to incorporate an instruction decoding facility to either the instruction buffer or the buffer controller circuit to decode the instructions stating prefetch of instructions into the instruction buffer. It can be determined thereby whether or not the instruction prefetched into an instruction buffer is a branch instruction. When the prefetched instruction is a branch, the number of instructions that may be wasted if prefetched can be reduced by suspending the prefetching of following instructions.

Furthermore, it may be desirable to incorporate an address calculation facility to either the instruction buffer or the buffer controller circuit. If the destination address of branch by a branch instruction can be determined by means of address calculation, prefetching of the instruction at the branch destination will allow to execute instructions during prefetching of new instructions from the external memory to the instruction buffer, without interrupting the execution of programs. In addition, it may be more desirable to incorporate at least two units of instruction buffers to prefetch both the instruction in an address consecutive to the instruction address of a branch instruction and the instruction in the branch destination. In both cases in which the execution sequence branches by a branch instruction or does not branch, instructions may be executed without interrupting the program to be executed during prefetching a new instruction from the external memory to the instruction buffer.

It may be more preferable to incorporate instruction decoding facility as well as an operand buffer to either the instruction buffer or the buffer controller circuit to allow an appropriate operand to be prefetched when an instruction requiring its own operands is prefetched. If the operand is an immediate data modified by an address, the external memory is to be accessed for fetching the immediate data. Thus prefetching of the immediate data at the time of instruction prefetching may allow instructions to be executed without interrupting the program to be executed.

It may be further desirable to incorporate a cache memory to the data processor to reuse part or all of programs stored in the cache memory at the time when a branch to an address or a loop processing already performed, or the entire protocol handling is carried out, resulting in significant decrease of the occurrence of interrupted execution of programs caused by the access to the external memory.

The present invention will be described herein below in greater details when applied to a cellular phone system by way of example. A cellular phone in accordance with the invention may comprise a data processor, a memory, and a bus connected to the data processor and the memory. The memory may store programs for at least either protocol handling or system management. The data processor may include an instruction executing unit for fetching instructions and decoding thus fetched instructions to execute thus fetched and decoded instructions, and a bus controller that includes a plurality of instruction buffers each having the number of bits equal to the number of instruction fetches performed by the instruction executing unit, flags each corresponding to respective instruction buffers, and a buffer control circuit. The bus controller further controls access to the memory through a bus based on signals originating from the instruction executing unit. The buffer control circuit will allocate an inherent value to each of the instruction buffers, which value may be expressed by a plurality of lower bits in each instruction address. If an instruction is fetched which has an address corresponding to the smallest possible value expressed by the plural lower bits, then the buffer controller circuit will load the instructions in the range from the one having an address next to that of the already fetched instruction to the last instruction having an address expressed by the lower plural bits into the instruction buffers corresponding to the addresses of the loaded instructions, and set the flag associated with each of the instruction buffers to a first state. Given an instruction fetch request from the instruction executing unit and if there is detected first state of the flag associated with the instruction buffer corresponding to the value expressed by the lower plural bits in the instruction address to be fetched by the instruction executing unit, then the buffer controller circuit will output the instruction in the appropriate instruction buffer to the instruction executing unit, and set the flag of the corresponding instruction buffer to a second state.

If there is detected in second state the flag associated with the instruction buffer corresponding to the value expressed by the lower plural bits in the address of the instruction to be fetched by the instruction executing unit, the address being output by the instruction executing unit, then the instructions in the range from the one having an address next to that of the instruction to be fetched to the last instruction address expressed by the lower plural bits may be loaded into the instruction buffers corresponding to the addresses of the instructions, the flag of each of the corresponding instruction buffers being reset to a first state.

Among the instructions to be fetched by the instruction executing unit, of which the instruction addresses are output by the instruction executing unit, either an instruction having an address corresponding to the smallest possible value expressed by the lower plural bits in the instruction address or an instruction having an address in which the value expressed by the lower plural bits represents second state of the flag, may be read from the memory and fed directly to the instruction executing unit rather than stored in the instruction buffer.

The instruction executing unit may output predetermined signals depending on types of fetched instructions. The buffer controller circuit may set all of the flags associated with the instruction buffers to the second state in response to first signals output by the instruction executing unit. The instructions which may causes the instruction executing unit to output the first signals may be for instance a branch instruction.

The above and other novel objects and features in accordance with the present invention will be clear when reading the following description of preferred embodiments in conjunction with the accompanying drawings.

BRIEF DESCRIPTION OF THE DRAWINGS

FIG. 17 is a flowchart of the operation of the instruction buffer in case of both a branch and a non-branch instruction.

DETAILED DESCRIPTION OF THE PREFERRED EMBODIMENTS

Figure 1:
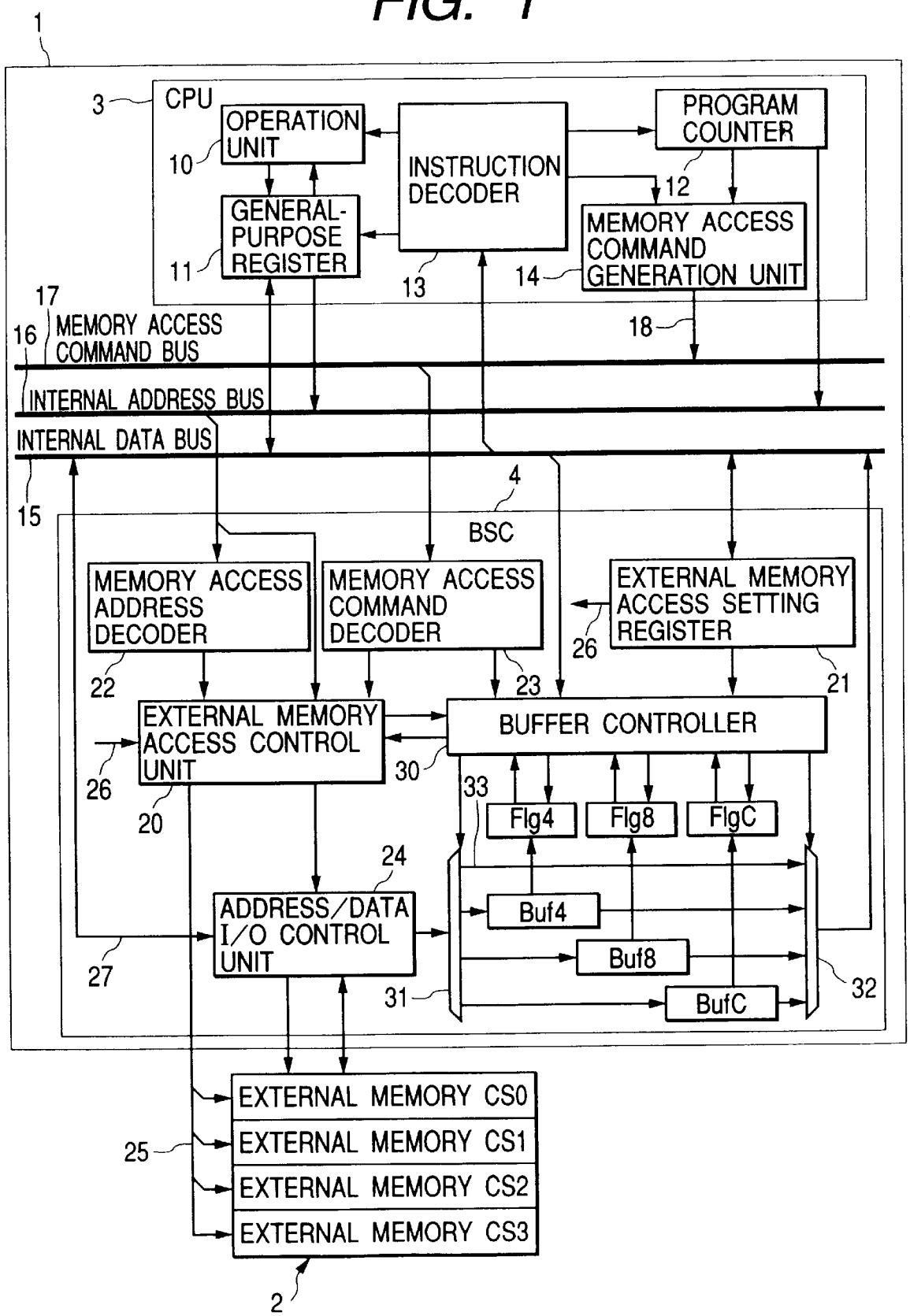
FIG. 1 is a schematic block diagram illustrating an exemplary data processing system including a data processor in accordance with the present invention.

FIG. 1 shows an exemplary data processing system in accordance with the present invention. In the figure typically depicted are a data processor 1 and an external memory 2 inclusive.

The data processor 1 has a central processing unit (CPU) 3 and a bus controller unit (BSC) 4. The CPU 3 comprises an instruction executing means for fetching instructions, and decoding thus fetched instructions to execute thus fetched and decoded instructions. The bus controller 4 controls access through an external bus to the external memory 2 and the like in response to the commands sent from the CPU 3.

The CPU 3 includes an operation unit 10 representing in general an arithmetic logic unit (ALU), a general-purpose register 11, a program counter 12, an instruction decoder 13, and a memory access command generator unit 14. The program counter 12 may contain the address of the instruction to be executed in the next step. The memory access command generating unit 14 may accept control information from the instruction decoder 13 for memory access operations. In addition, the memory access command generation unit 14 outputs a memory access command 18 onto a memory access command bus 17 in synchronism with an instruction address being output from the program counter 12 to an internal address bus 16 for the instruction fetch, and also in synchronism with a data address being output from the general-purpose register 11 to the internal address bus 16 for the data access operation. The memory access command 18 includes information with respect to the type of operation as read/write, information describing the accessing data width (number of parallel data bits), information indicating an instruction fetch cycle, and information specifying whether the instruction fetch is a forced instruction fetch or a normal instruction fetch. The forced instruction fetch indicates in the context herein that the fetching of a branch destination instruction using a branch instruction that changes the order of instructions to be executed from a linear address sequence to a different address sequence. The normal instruction fetch indicates that the address of the instruction to be fetched is linear and continuous in sequence to the address of the previously fetched instruction.

If the memory access command supplied is an instruction fetch by accessing the memory, then an instruction read through the bus controller 4 will be transferred to the instruction decoder 13 through the internal data bus 15. The instruction decoder 13 will decode the instruction and execute the instruction in accordance with the decoded result. More specifically, the instruction decoder 13 will load an operand from the external memory 2 into the general-purpose register 11, direct the operation unit 10 to operate on the operand, and control processes of storing the operation result into the external memory 2 in order to execute the instruction.

If the memory access command designates a data access operation to the memory, then either the data read via the bus controller 4 will be loaded into the general-purpose register 11 through the internal data bus 15, or the write data output from the general-purpose register 11 onto the internal data bus 15 will be written to the external memory 2 through the bus controller 4.

Figure 2:
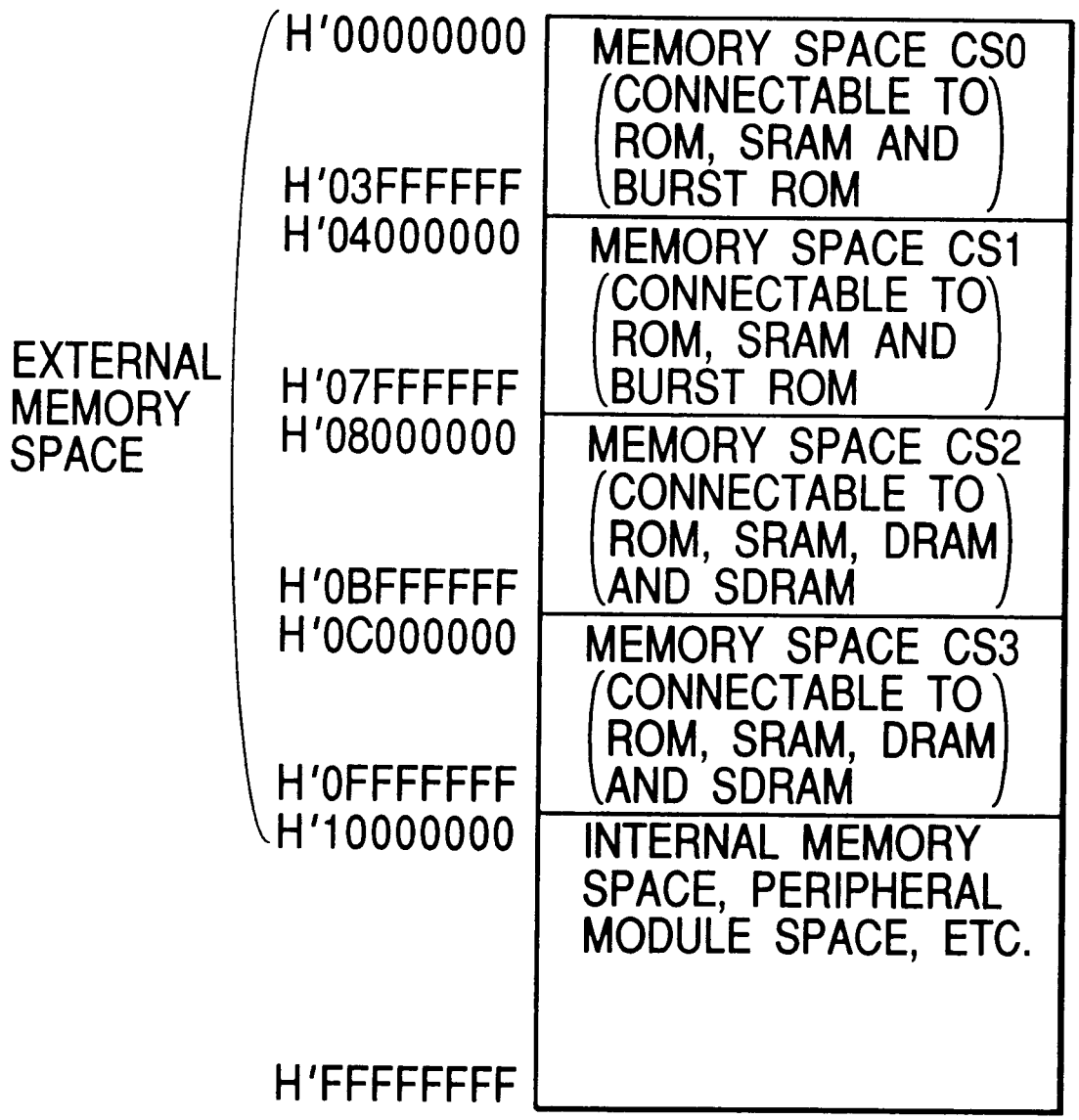
FIG. 2 is an address map of a CPU built in to the data processor.

A typical address map of the CPU 1 is shown in FIG. 2. Addresses between H'00000000 and H'0FFFFFFF are spaces for external memory, and addresses in the range from H'10000000 to H'FFFFFFFF are spaces for internal memory, peripheral module, and the like. The space for external memory is divided into areas CS0 through CS3 each having a given capacity. Memory devices connectable to the space for external memory CS0 through CS3 are comprised of, but not limited to, some of a number of devices, which may be previously selected from such device types as ROM (read only memory), SRAM (static random access memory), burst ROM, DRAM (dynamic random access memory), SDRAM (synchronous DRAM), and others. The external memory 2 is comprised of memory devices thus allocated to the external memory spaces CS0 through CS3 . That is, the external memory 2 is a generic name representing the memory devices allocated to the four memory spaces CS0 through CS3. An external program memory area is allocated but not limited to a predetermined region extending from the beginning of the memory space CS0.

The bus controller 4 will execute access control on each of the memory spaces CS0 through CS3 in the external memory 2. An external memory access control unit 20 will generate access control signals 25, which are needed for access control of the memory chips in each of the memory spaces CS0 through CS3. For example, when the memory space CS2 to which a DRAM is allocated is the targeted for access, then the external memory access control unit 20 will output a row address strobe signal, a column address strobe signal, and a write enable signal; when the memory space CS3 to which an SRAM is allocated is targeted for the access, then the external memory access control unit 20 will output a chip enable signal as well as a read/write signal.

A value that is set to an external memory access setting register 21 may determine which memory device is to be allocated to which memory space. For instance, each memory space is allocated to a configuration area for control code information (memory device control code) 26, which indicates the characteristics of memory devices (e.g., number of required wait state cycles, number of parallel I/O data bits). A memory device control code 26 registered in its corresponding configuration area will be sent to the external memory access control unit 20.

Which memory space will be targeted for access may be determined by having the address on the internal address bus 16 decoded by a memory access address decoder 22 and by supplying the decode result to the external memory access control unit 20. Whether an access request from the CPU 3 is a request for data access, a request for instruction fetch, a read operation, or a write operation will be determined by having the memory access command on the memory access command bus 17 decoded by a memory access command decoder 23 and by sending the decoded result to the external memory access control unit 20.

With reference to the input information, the external memory access control unit 20 will supply the access control information such as chip selection signals to the memory device of the target for access to the external memory 2, and causes an address/data I/O control unit 24 to control the supply of address signals as well as data input and output. In the data access operations, read data as well as write data will be passed through a data path 27.

For instruction prefetch purposes, the bus controller 4 may include for example three instruction buffers Buf4, Buf8 and BufC, flags Flg4, Flg8 and FlgC, which may be intrinsic to the instruction buffers respectively; a buffer controller 30; an input stage selector 31; and an output stage selector 32. The input stage selector 31 may provide one-to-four output selection, while the output stage selector 32 may carry out four-into-one input selection. Between the output of the input stage selector 31 and the input of the output stage selector 32, there are provided interposingly a through path 33 as well as the instruction buffers Buf4, Buf8 and BufC in parallel.

The instruction set of the CPU 3 may be in 16 bits fixed length, but may not be limited thereto. The CPU 3 may perform an instruction fetch in increments of two instructions (in units of 32 bits). The address signals output from the CPU 3 may be byte addresses, comprised of a byte (8 bits) as a minimal set. In conjunction with the byte address, each of the instruction buffers Buf4, Buf8 and BufC may be in 32 bits long. Lower significant four bits in one byte-long address signals will be used to manage sequential 16-byte-long instructions. In such a case, the instruction buffer Buf4 may be used for a prefetch area, into which to prefetch an instruction address with its four lower bits being H'4 (=B'0100); the instruction buffer Buf8 may be allocated for a prefetch area into which to prefetch an instruction address with its lower four bits being H'8 (=B'1000); the instruction buffer BufC may be allocated as prefetch area into which to prefetch an instruction address with its lower four bits being H'C (=B'1100). The allocation logic of instruction buffer addresses may be provided in the buffer controller 30.

When the memory access command decoder 23 detects an instruction fetch command, the buffer controller 30 will determine whether the instruction fetch command designates a normal instruction fetch or a forced instruction fetch on the basis of the decode output of the memory access command decoder 23. Furthermore, the buffer controller 30 will use the lower four bits of the internal address bus 16 to determine the value expressed by those bits.

If the buffer controller 30 determines that the specified instruction fetch command is a normal instruction fetch, and that the fetch is directed toward an instruction address that has a start value of (H'0) indicated by its four lower bits, then the buffer controller 30 will perform an instruction fetch from the starting instruction address of the external memory 2, and an instruction prefetch to the instruction buffers Buf4, Buf8 and BufC in correspondence with the addresses following the start address. More specifically, the buffer controller 30 will cause the external memory access control unit 20 to read instructions by 32 bits from the memory space CS0 via the address/data I/O controller unit 24 to output thus fetched instructions to the input stage selector 31. The buffer controller 30 will forward the instructions supplied to the input stage selector 31 toward the through path 33 and will switch the output stage selector 32 to select the through path 33 in order to output the instructions to the internal data bus 15 and to the ultimate destination, the instruction decoder 13.

Thereafter, the buffer controller 30 will change the four lower bits of the instruction fetch address to H'4, H'8 and H'C successively to store those instruction addresses in the instruction buffers Buf4, Buf8 and BufC respectively. At this point, the buffer controller 30 will control, through the external memory access controller unit 20, the access to the external memory 2 when the CPU 3 does not access the external memory 2. Each time the buffer controller 30 stores an entry in either of the instruction buffers Buf4, Buf8 and BufC, the corresponding flag Flg4, Flg8 or FlgC will be set to valid status (i.e., a set state).

If the buffer controller 30 determines that the instruction fetch command supplied is a normal instruction fetch and that the four lower bits in the instruction address are in any one of H'4, H'8 and H'C, then the buffer controller 30, instead of performing an instruction fetch from the external memory 2, will control the output stage selector 32 to select the output from the corresponding instruction buffer Buf4, Buf8 or BufC having instructions already prefetched thereto. As a result, the instructions to be fetched will be output to the internal data bus 15, then finally to the destination, the instruction decoder 13. The buffer controller 30 will set the flag in correspondence with the instruction buffer of which the entry has been output to invalid status (i.e., a reset state).

If the instruction fetch command is found to specify a forced instruction fetch, then the buffer controller 30 will at first set all of the flags Flg4, Flg8 and FlgC forcibly to the invalid status. Regardless of the values expressed by the four lower bits in the instruction address in question, the buffer controller 30 will control the instruction fetch from that address in the external memory 2 and the instruction prefetch to the instruction buffers starting at the address next to that of the instruction address in question. More specifically, the buffer controller 30 will direct the external memory access controller unit 20 to read instructions requested by the forced instruction fetch from the memory space CS0 through the address/data I/O controller unit 24 and to output thus read instructions to the input stage selector 31. The buffer controller 30 will forward the instructions into the through path 33 via the input stage selector 31 and then the output stage selector 32 in turn will select the through path 33, in order to output the instructions over the internal data bus 15 to the instruction decoder 13. Thereafter, the buffer controller 30 will change the four lower bits in the forced instruction fetch address for address shifting up to H'C so as to place the individual instruction addresses into the corresponding instruction buffers. For instance, if the four lower bits in the forced instruction fetch address are H'4, then these bits are to be changed successively to H'8 and to H'C for a prefetch into the instruction buffers Buf8 and BufC. At this point, the buffer controller 30 will control, through the external memory access controller unit 20, the access to the external memory 2 while the CPU 3 does not access the external memory 2. As have been described above, each time the buffer controller 30 stores an entry into any one of the instruction buffers, the corresponding flag will be set to valid (i.e., a set state).

Figure 3:
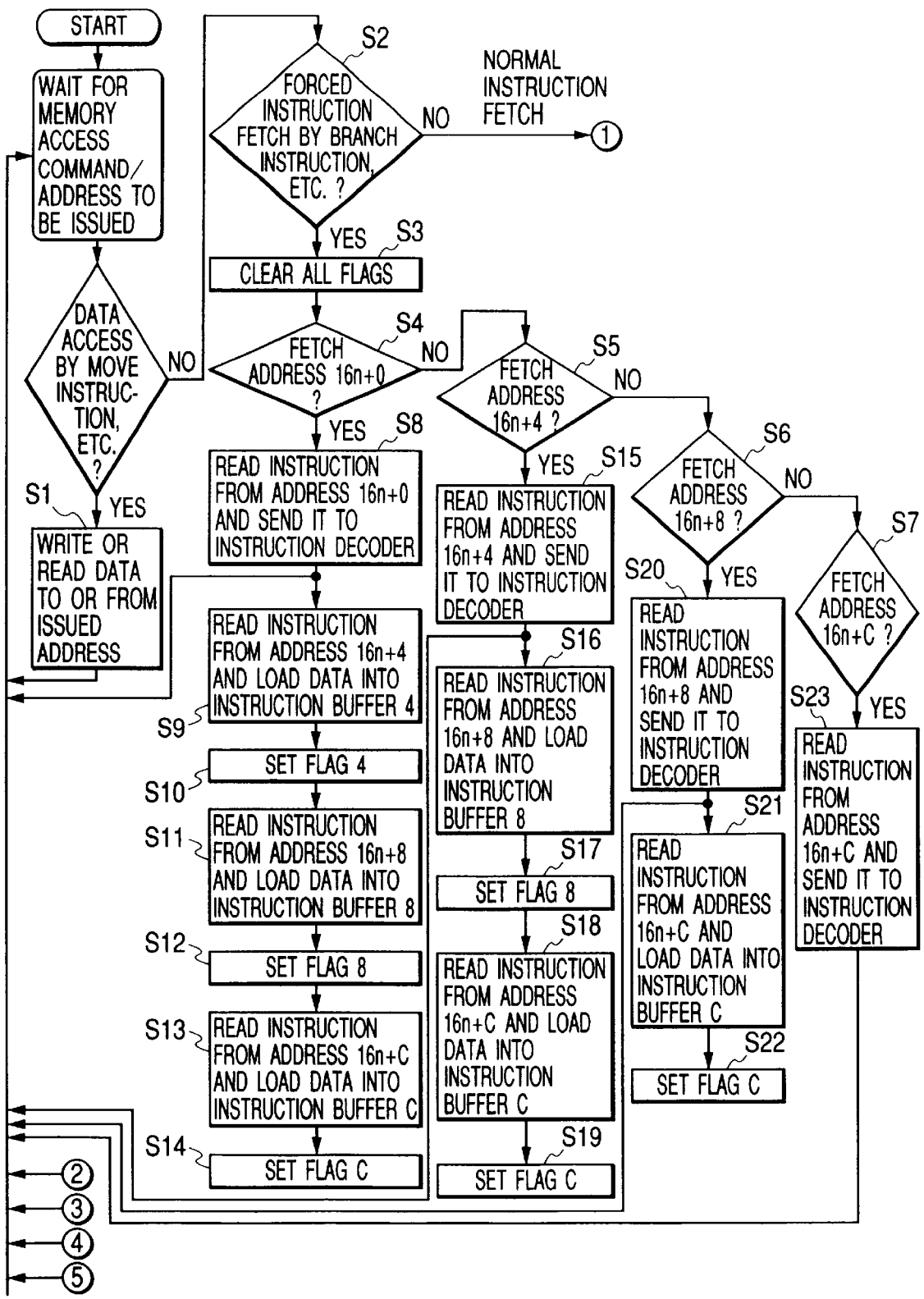
FIG. 3 is a flowchart of steps that are continued to FIG. 4 and which constitute instruction fetch and prefetch control procedures performed by the data processor.
Figure 4:
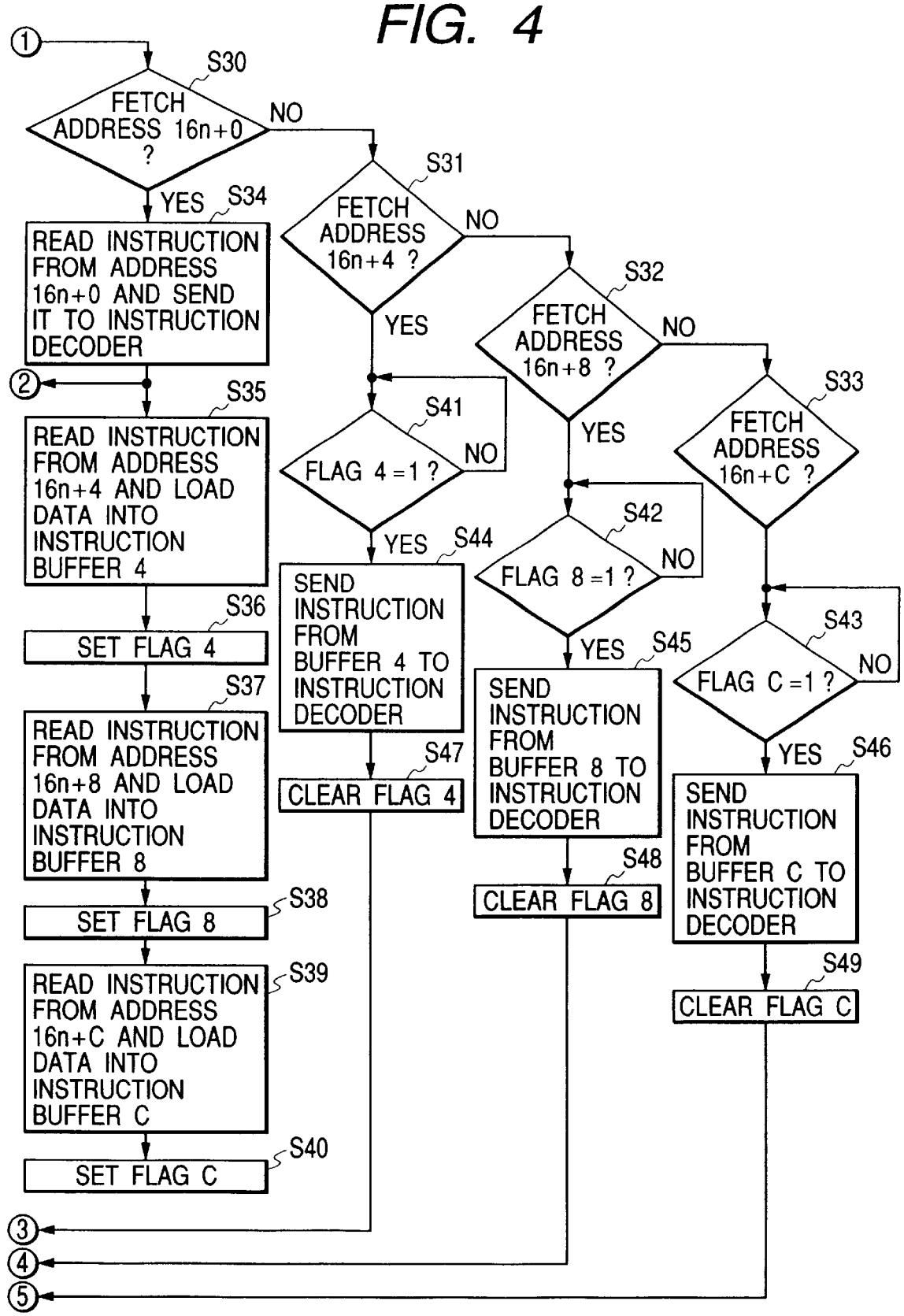
FIG. 4 is a flowchart of steps which are continued from FIG. 3 and which constitute the instruction fetch and prefetch control procedures performed by the data processor.

FIGS. 3 and 4 show flowcharts of steps representing instruction fetch and prefetch control procedures executed by the data processor 1.

If the access request to the external memory 2 turns out to be a request for data access, a read/write operation is carried out on the issued address (step S1).

If the access request denotes something other than data access, a check is performed to see if the request in question is for a forced instruction fetch (step S2). If the access request is determined to designate a forced instruction request, then the flags Flg4, Flg8 and FlgC will be reset (step S3). At this point, a value expressed by the four lower bits in the fetch address will also be determined (steps S4 through S7). For example, if the instruction address of the forced instruction fetch is 16n+0 (i.e., lower 4 bits=H'0), then the instruction at the instruction address 16n+0 will be transferred from the external memory 2 to the instruction decoder 13 (step S8). The CPU 3 will decode the fetched instruction and be ready to act accordingly. Thereafter, while the external memory 2 is not being accessed by the CPU 3, the bus controller 4 will prefetch instructions from subsequent instruction addresses 16n+4 (i.e., lower 4 bits=H'4), 16n+8 (i.e., lower 4 bits=H'8), and 16n+C (i.e., lower 4 bits=H'C) to the corresponding instruction buffers Buf4, Buf8, and BufC, and will set the corresponding flags Flg4, Flg8 and FlgC (steps S9 through S14) to the set status. If the instruction address of the forced instruction fetch is either 16n+4 or 16n+8, then the instruction at the applicable address will be transferred likewise to the instruction decoder 13 (steps S15 and S20). Instructions in the subsequent instruction addresses will be prefetched therefrom to the instruction buffers, and the corresponding flags will be set accordingly (steps S16 through S19, S21 and S22). If the instruction address of the forced instruction fetch is 16n+C, then the instruction at the address in question will be fetched to the instruction decoder 13 (step S23), and no instruction will be prefetched to the instruction buffers.

If in the check in step S2 a normal instruction fetch is detected, then a value expressed by the four lower bits in the fetch address in question will be determined as shown in FIG. 4 (steps S30 through S33). For example, in case in which the instruction address of the normal instruction fetch is 16n+0 (lower 4 bits=H'0), then the instruction at instruction address 16n+0 will be transferred from the external memory 2 to the instruction decoder 13 (step S34). The CPU 3 will decode the fetched instruction and will be ready to serve accordingly. Thereafter, while the external memory 2 is not being accessed by the CPU 3, the bus controller 4 will prefetch instructions from the subsequent instruction addresses 16n+4 (lower 4 bits =H'4), 16n+8 (lower 4 bits= H'8), and 16n+C (lower 4 bits =H'C) to the corresponding instruction buffers Buf4, Buf8 and BufC, and will flag the corresponding flags Flg4, Flg8 and FlgC (steps S34 through S40). If the instruction address of the normal instruction fetch is either 16n+4, 16n+8 or 16n+C, then the data processor 1 will wait for the corresponding flag Flg4, Flg8 or FlgC, expressed by the four lower bits of the instruction address in question, to be set (step S41 through S43). Then the instructions will be transferred from the corresponding instruction buffer Buf4, Buf8 or BufC to the instruction decoder 13 (steps S44 through S46). After the instruction transfer, the appropriate flag will be reset (steps S47 through S49).

Figure 5:
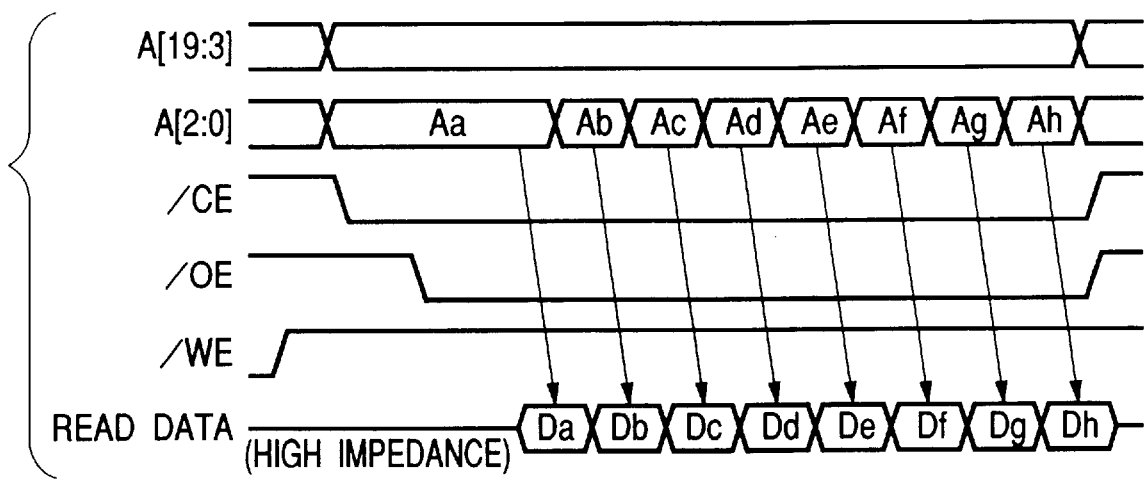
FIG. 5 is a timing chart of memory read operations in page mode on an external memory comprised of a flash memory having a page mode feature.

FIG. 5 is a timing chart showing exemplary operation timings of a memory device allocated for the memory space CS0 of the external memory 2. The timings in FIG. 5 apply for example to the memory read operation in the page mode, which mode may be carried out by a flash memory device implementing the page mode. The flash memory device is an electrically erasable (rewritable) semiconductor memory device, which is comprised of memory cell transistors used for memory elements, each transistor having source, drain, floating gate and control gate electrodes. In FIG. 5, the address signal A[19:3] represents a 17-bit memory page address signal. The address signal A[2:0], i.e., three-bit, intra-page, address signal, can be switched sequentially for accelerating the access to and within a same page. Assuming that program instructions are almost executed linearly and has only few branch instructions, it may become possible to reduce the time required for reading out data under the condition that the output of instructions from the instruction buffer BufC is used to output the signal CE or the page address of next instruction. When prefetching of instructions is considered, the prefetch instructions that must be completed within a certain idle period between the external memory accesses performed by the CPU 3 can be significantly accelerated by the contribution of page-mode flash memory device used as the memory device allocated to the memory space CS0 that contains programs. In FIG. 5, the signal CE designates to chip enable signals, for directing to select a chip; OE to an output enable signal, which directs an output operation; and WE to write enable signals for specifying a write operation.

Figure 6:
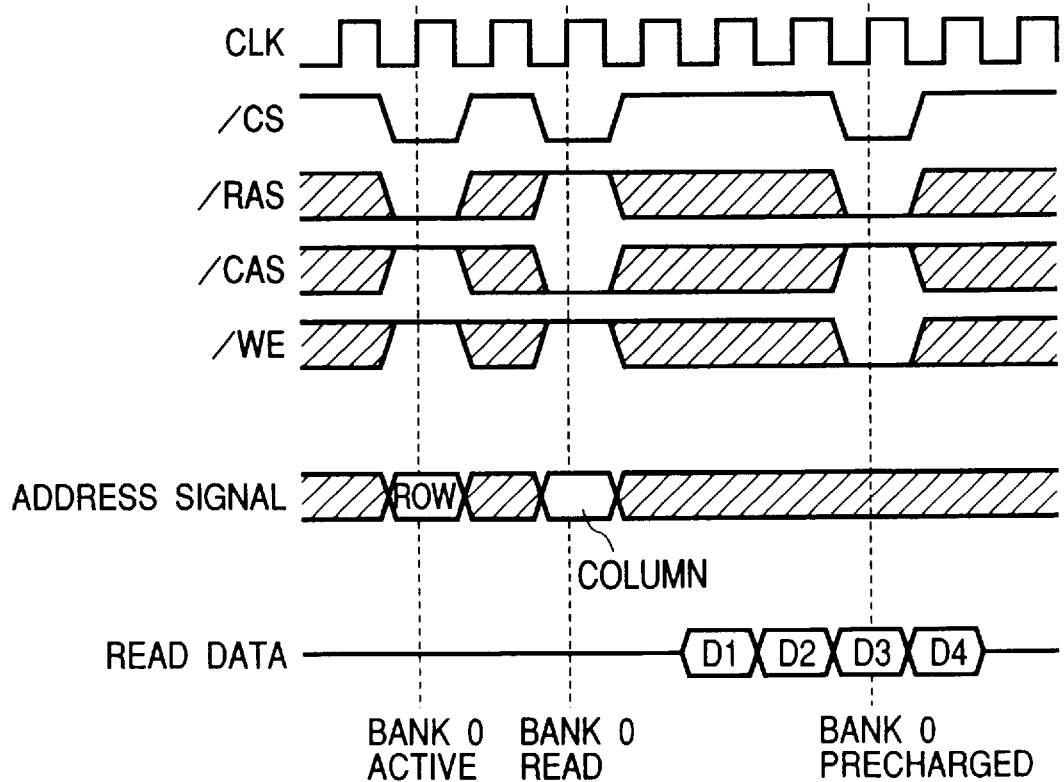
FIG. 6 is a timing chart of burst read operations on an external memory comprised of an SDRAM having a burst mode operation.

FIG. 6 is a timing chart of typical operation timings of another memory device used for the memory space CS0 in the external memory 2. The timings in FIG. 6 apply illustratively to memory read operations in burst mode carried out by an SDRAM. The SDRAM is made of a plurality of memory banks, each of which includes a number of dynamic memory cells, which in turn are each comprised of a transistor for selector and a capacitor for storage. The SDRAM may operate at the rate of clock cycles in cooperation with commands supplied in synchronism with the clock signals. The burst length of the burst operation (number of data items, which are continuously output) and the CAS latency (number of clock cycles from the start of a column-related operation to data output) may be preset in a control register of the SDRAM.

When the chip selection signal /CS goes to low the SDRAM may accept a command or data. When the command input is enabled by the chip select signal /CS, if a bank activating command is selected by the state of row address strobe signal /RAS, column address strobe signal /CAS and write enable signal /WE, then a bank and a row address will be specified by the address signal input along therewith at the same time, so that a word line will be selected by the row address. Next, when the command input is enabled by the chip select signal /CS, if a bank read command is selected by the state of the row address strobe signal /RAS, the column address strobe signal /CAS and the write enable signal /WE, then a column address will be specified by the address signal input along therewith at the same time. Column-oriented operations such as selection of a bit line may be carried out as per the column address. Data D1 thus retrieved may be output to the outside in synchronism with clock signal cycles that are determined by the CAS latency. In the example of FIG. 6, the CAS latency is 2. Thereafter, column-oriented operations will be repeated, and the column address will be updated by the internal address counter for the number of times corresponding to the burst length specified. For example, if the burst length is 4, then the output data D1 will be followed by that of data D2, D3 and D4 in synchronism with the clock cycles of the clock signal CLK. When considering the prefetching of instructions, the instruction prefetch that must be completed during the idle period of the external memory access by the CPU 3 may be accelerated by the contribution of SDRAM, which, as shown in FIG. 6, operatable in the burst mode, is used for the memory devices of the memory space CS0 for storing programs.

In case in which the program instructions are mostly executed linearly and have few branch instructions, it is possible to reduce the time up to data retrieval if the output of instructions from the instruction buffer BufC is used to prompt selection of a word line.

Figure 7:
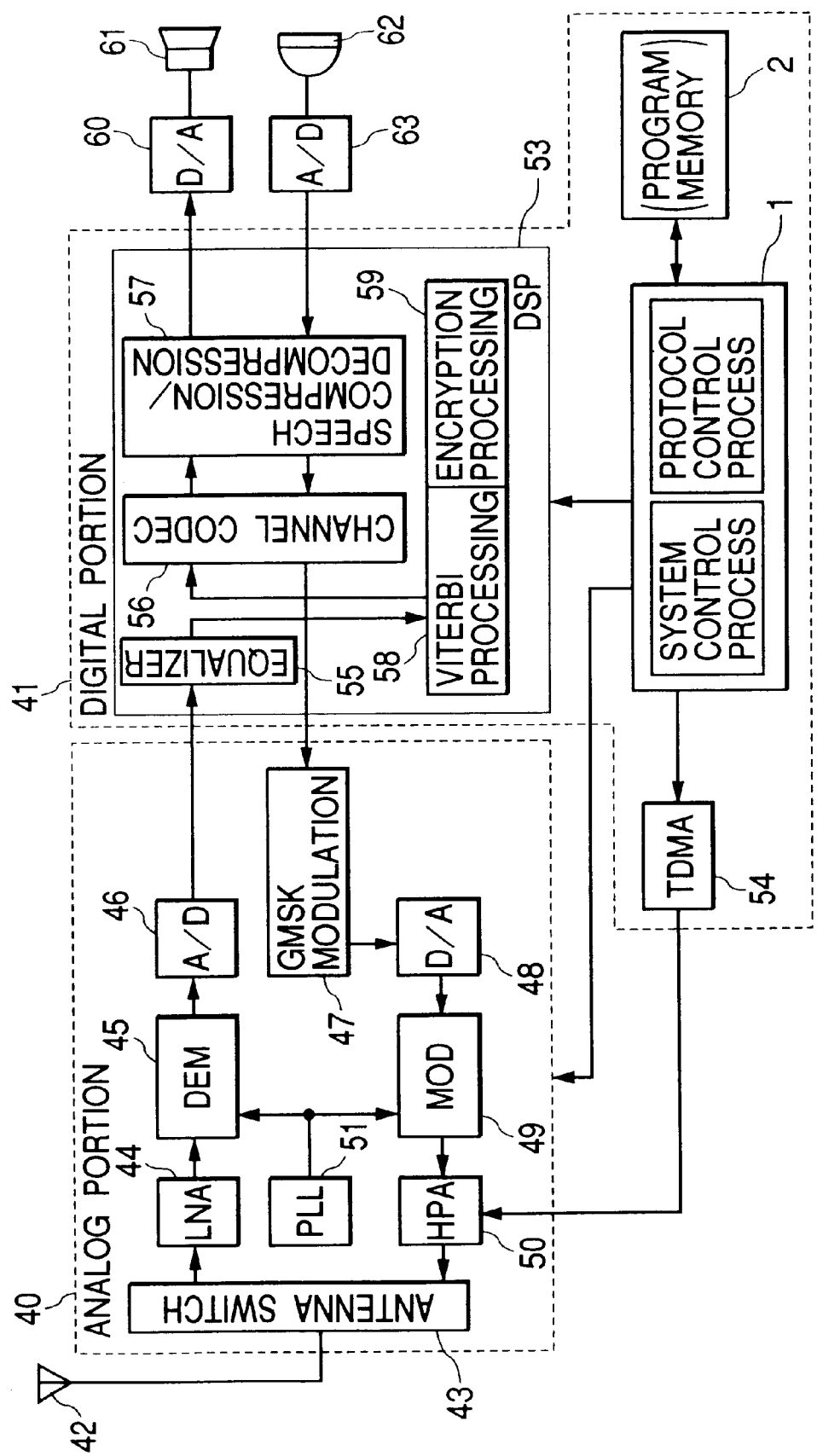
FIG. 7 is a block diagram of a cellular phone system utilizing the data processor shown in FIG. 1.

FIG. 7 is a block diagram of a mobile telephone system utilizing the data processor of FIG. 1. This cellular phone system comprises two major sections: an analog section 40 and a digital section 41. In the analog section 40, an antenna 42 is connected to an antenna switch 43 that is served as a duplexer. Radio frequency signals received by the antenna 42 will be sent to a low-noise amplifier (LNA) 44 for removal of radio frequency noises contained in the signals. The signals will be forwarded to a detector/demodulator circuit (DEM) 45 whereby the detected signals will be demodulated. The demodulated signals will be converted to digital data by an A/D converter 46 prior to being sent to the digital section 41. Digital transmission data coming from the digital section 41 will be encoded by for example a GMSK (Gaussian Filtered Minimum Shift Keying) modulation circuit 47. The encoded data will be converted to analog signals by a D/A converter 48. After conversion, the analog signals will be modulated by a modulator circuit (MOD) 49. The modulated signals will be amplified to radio frequency signals by a radio frequency amplifier (HPA) 50 prior to being transmitted away from the antenna 42. The modulator circuit (MOD) 49 and detector/demodulator circuit (DEM) 45 may operate in synchronism with clock signals generated in a PLL circuit 51.

The digital section 41 includes and is not limited by, a digital signal processing unit (DSP) 53, a time-division multiple access (TDMA) controller unit 54, the data processor 1, and the external memory 2. The digital signal processing unit 52 implements an equalizer 55, a channel CODEC 56, a speech compressor/decompressor unit 57, a Viterbi processing unit 58 and an encryption unit 59, by use of a product-sum operation circuit and its operation programs not shown in the figure. The equalizer 55 may equalize the output of the A/D converter 46. The equalized data will be checked by the Viterbi processing unit 58 for the logic value. The result of the check is supplied to the channel CODEC 56 for the predetermined and necessary format conversion. The data thus converted will be decompressed by the speech compressor/decompressor unit 57. Thus, decompressed data will be output by a speaker 61 through the D/A converter 60. Audio (including speech and sound) input to a microphone 62 will be converted to digital audio data by an A/D converter 63. The digital audio data will be compressed by the audio compressor/decompressor unit 57. The compressed data will be subjected to be convert to relevant format conversion through the channel CODEC 56 prior to being supplied to the GMSK modulation circuit 47.

During a call, the data processor 1 will control the operation of the analog section 40 as well as digital section 41 in real time basis. Furthermore, the data processor 1 will carry out the protocol handling and system control processes specific to the mobile communication scheme. The protocol handling process is a process, which determines in which cellular area the cellular phone in question is during a call or in standby mode, and which may switch base stations across cellular areas as needed.

The system control process is another process for detecting commands by buttons operated on the cellular phone system, and for controlling indications on the display. The processes of protocol and system control are not subject to strict requirements of real time basis operation and may contain a large-scaled program. For those reasons, the operation program for the real-time control may be stored in the internal ROM of the data processor 1, while on the other hand the operation program for protocol handling and system controlling processes will be stored in the external memory 2.

The operation program for protocol handling and system control processes may be the one that may be sequentially executable instructions in the linear and consecutive addresses with few loops. Not much advantageous effect on performance is thus expected from the use of a cache memory in the data processor 1 carrying out such programs. Any cache memory built into the data processor will raise manufacturing costs of the processor due to the increase of the total number of embedded transistors used in one processor. The addition of cache memory will also increase the total surface area occupied by the data processor. If the data processor 1 having the above-described instruction prefetch facility is to be utilized, then the structure of prefetch control can be appreciably simplified because any one of the instruction buffers Buf4, Buf8 and BufC that will accommodate an instruction read from the outside for a prefetch may be uniquely determined by a value expressed by the four lower bits in the address of the instruction in question. The structure for such instruction prefetching scheme can be implemented in a manner much simpler than the address tag basis control feature of a cache memory or the counter basis read and write pointer control feature of the FIFO buffer. This may contribute to saving the cost of a cellular phone system and shrinking the size of terminals.

In particular, prefetching of instructions into the instruction buffers needs to be done only when any one of the values each expressed by the lower plural bits in the instruction address may have reached to a predetermined value. For instance, in view of simplifying measures of instruction prefetch control scheme, if there is fetched an instruction from an address having its start value of H'0 expressed by the lower plural bits, instructions may be prefetched into the instruction buffers corresponding to the addresses in the range from the one next to the start instruction address to the terminating instruction address of H'C expressed by the lower bits. If a destination instruction of a branch is fetched by using a branch instruction, then instructions may be prefetched into the instruction buffers corresponding to the addresses in the range from the beginning one next to the address of the fetched branch destination instruction to the final instruction address expressed by the lower plural bits. In this way, the efficiency of instruction fetch might still be improved, even if a branch instruction caused any change in the sequence of instruction addresses.

Figure 8:
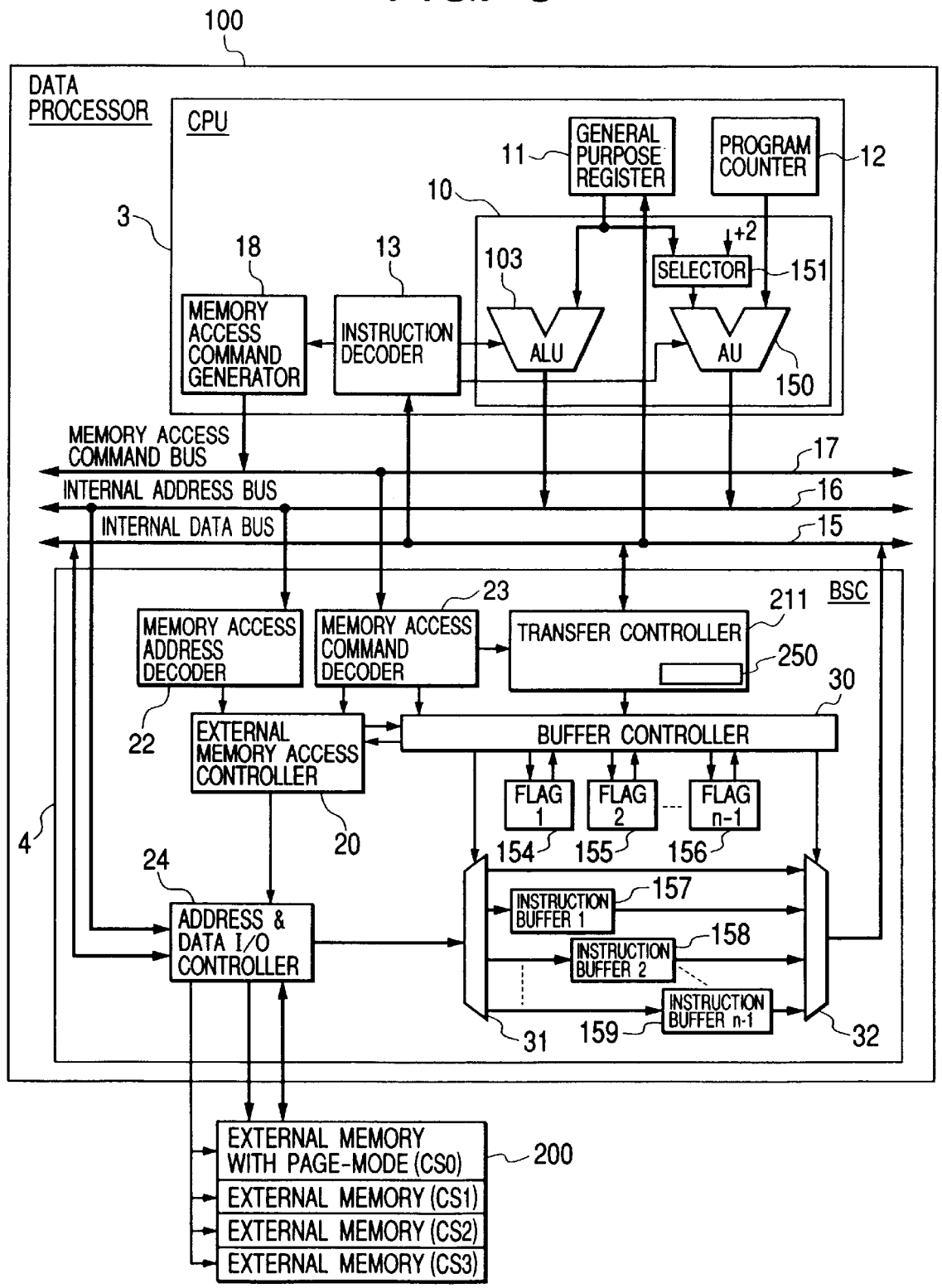
FIG. 8 is a schematic block diagram of another exemplary data processing system including a data processor in accordance with the present invention.

FIG. 8 shows another typical example of data processing system in accordance with the present invention. The data processing system shown in FIG. 8 will use a transfer controller unit 211 instead of the external memory access configuration register 21 shown in FIG. 1 to connect to the external memory 200 having page mode function, which will enable burst transfer from the data processor 100 to an external destination. In response to the burst transfer length determined in the transfer controller unit 211, control will be carried out by the buffer controller 30 so as to enable transfer of 'n' instructions at maximum from the external memory 200 to the instruction buffer.

The external memory with the page mode function (in the CS0 area) may store such programs as for instance the system control and protocol handling processes, which may relatively have fewer branches and loops, and execute instructions in a sequential manner.

Figure 9:
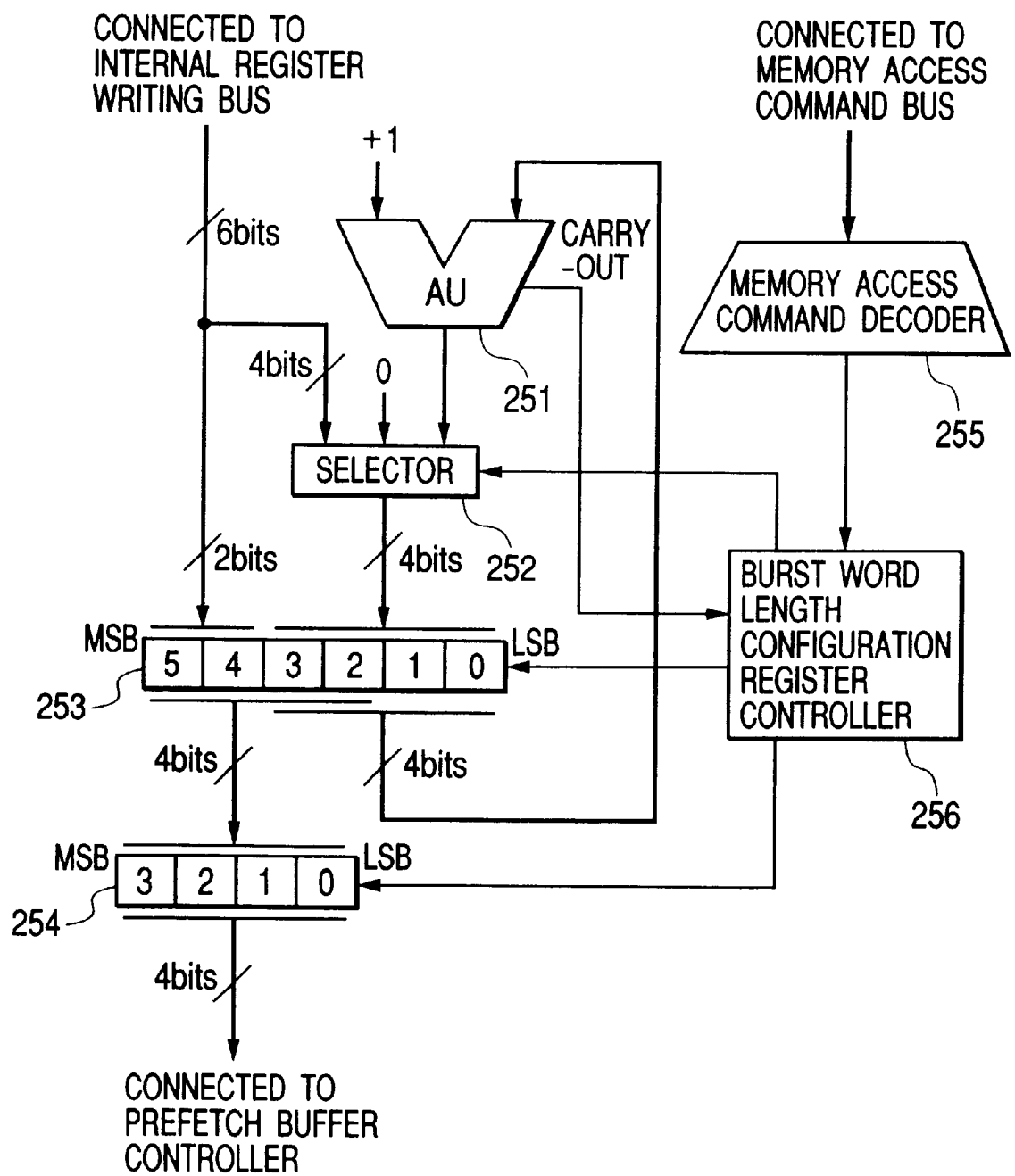
FIG. 9 is a schematic block diagram of an exemplary burst transfer length configurator unit shown in FIG. 8.
Figure 10:
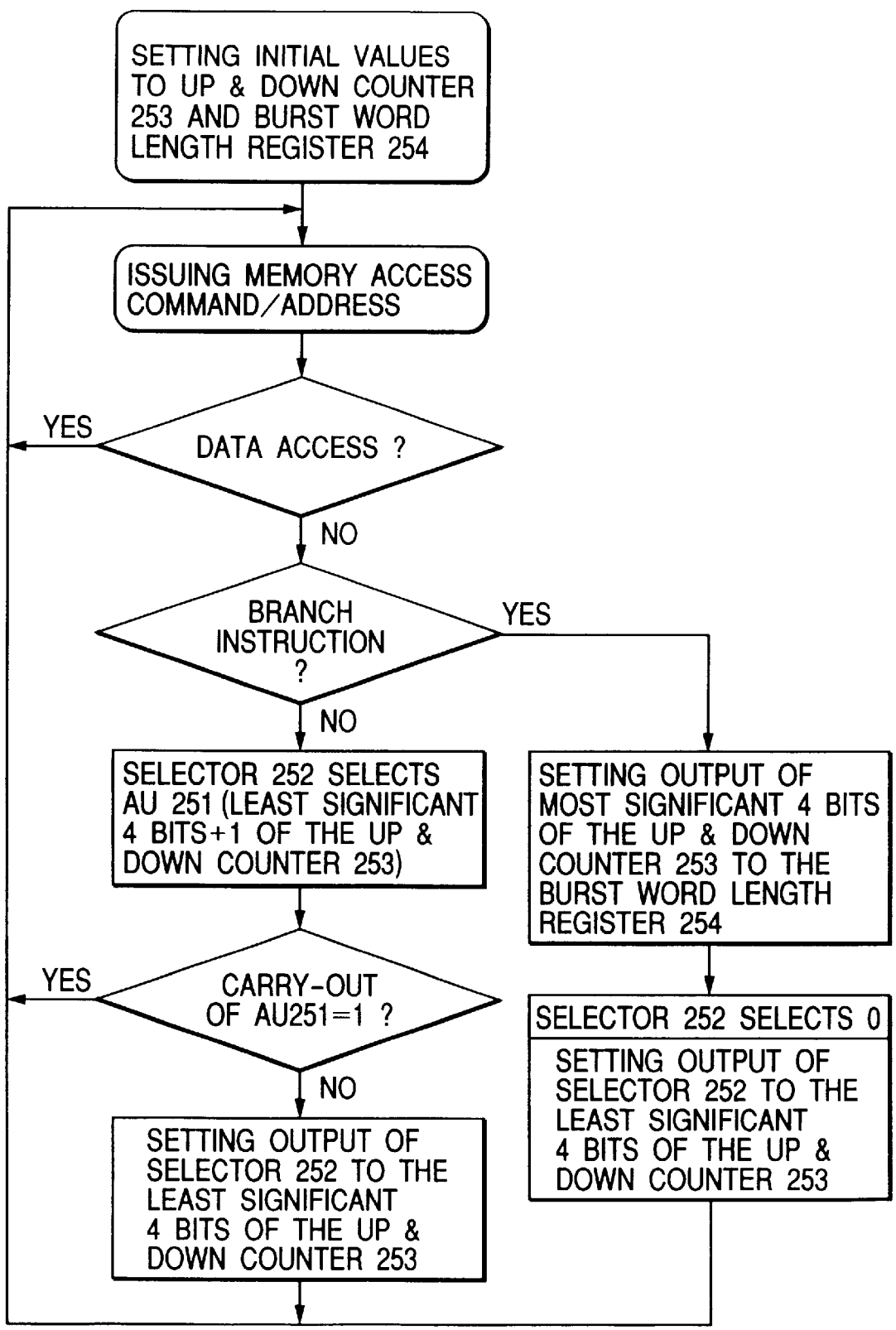
FIG. 10 is a flowchart illustrating the procedure of configuring burst transfer length in the burst transfer length configurator unit shown in FIG. 9.
Figure 11:
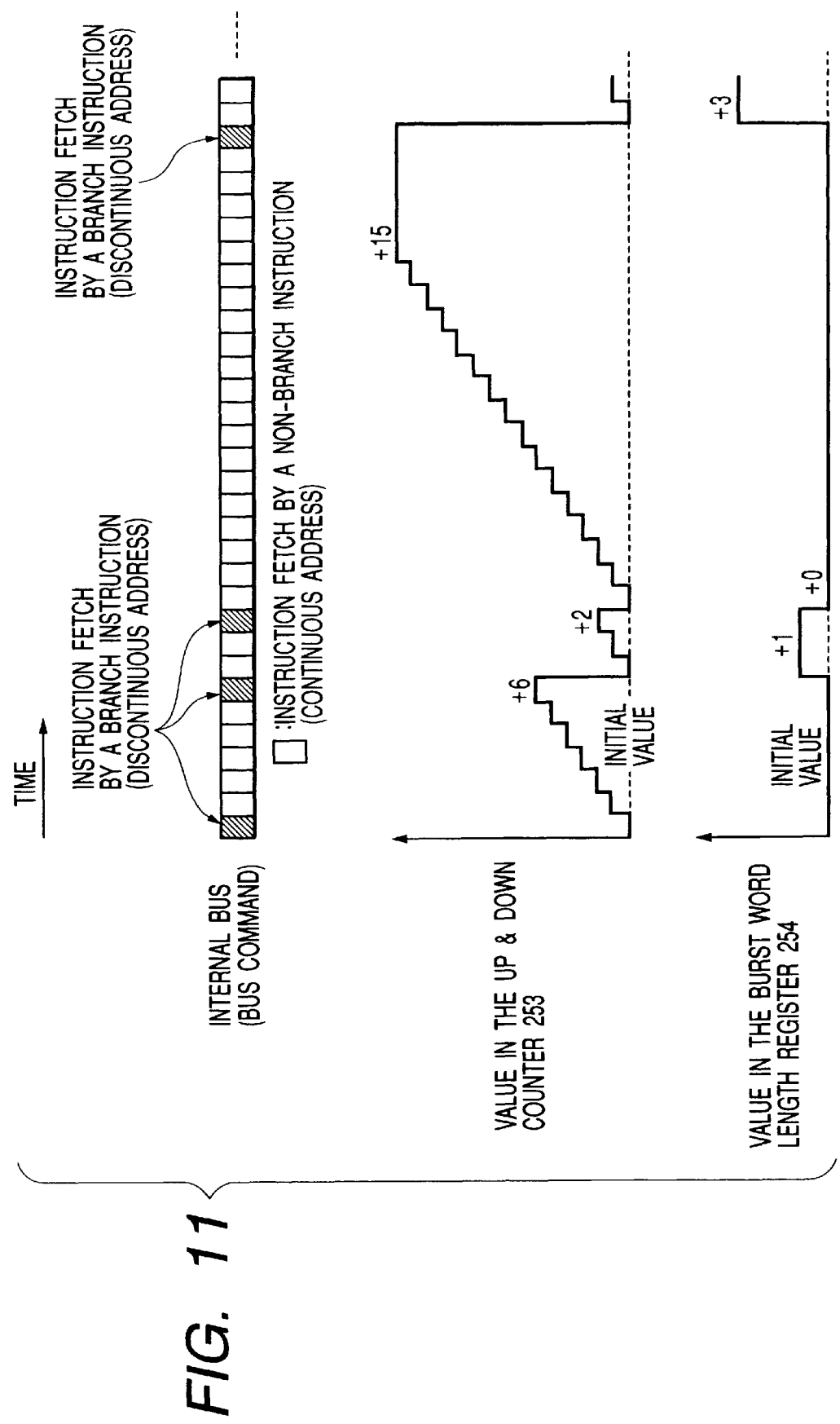
FIG. 11 is a schematic diagram illustrating an alternative example of burst transfer length configuration set by the burst transfer length configurator unit shown in FIG. 8.

FIG. 9 shows a schematic block diagram of the configurator unit 250 for the burst transfer length in the transfer controller 211. FIG. 10 shows the flow of configuration control for the burst transfer length, and FIG. 11 shows an alternative example of the up/down counter 253 and the burst word length register 254. The configurator unit 250 for the burst transfer length will count up the number of non-branch instructions that will be executed between two branch instructions to use the count to control the length of burst transfer so as to extend the length of burst transfer if the number of non-branch instructions to be executed prior to the occurrence of the next branch instruction, or on the other hand to shorten the length of the burst transfer if the non-branch instruction is to be executed prior to the occurrence of the next branch instruction. Although the burst transfer length configured for the default initial value may not be specifically limited, it can be of 4 instructions.

In the configurator unit shown in FIG. 9, the burst word length register 254 will be configured at the occurrence of a branch instruction. It is also possible to configure the register each time the count in the up/down counter 253 reaches to a predetermined value.

Figure 12:
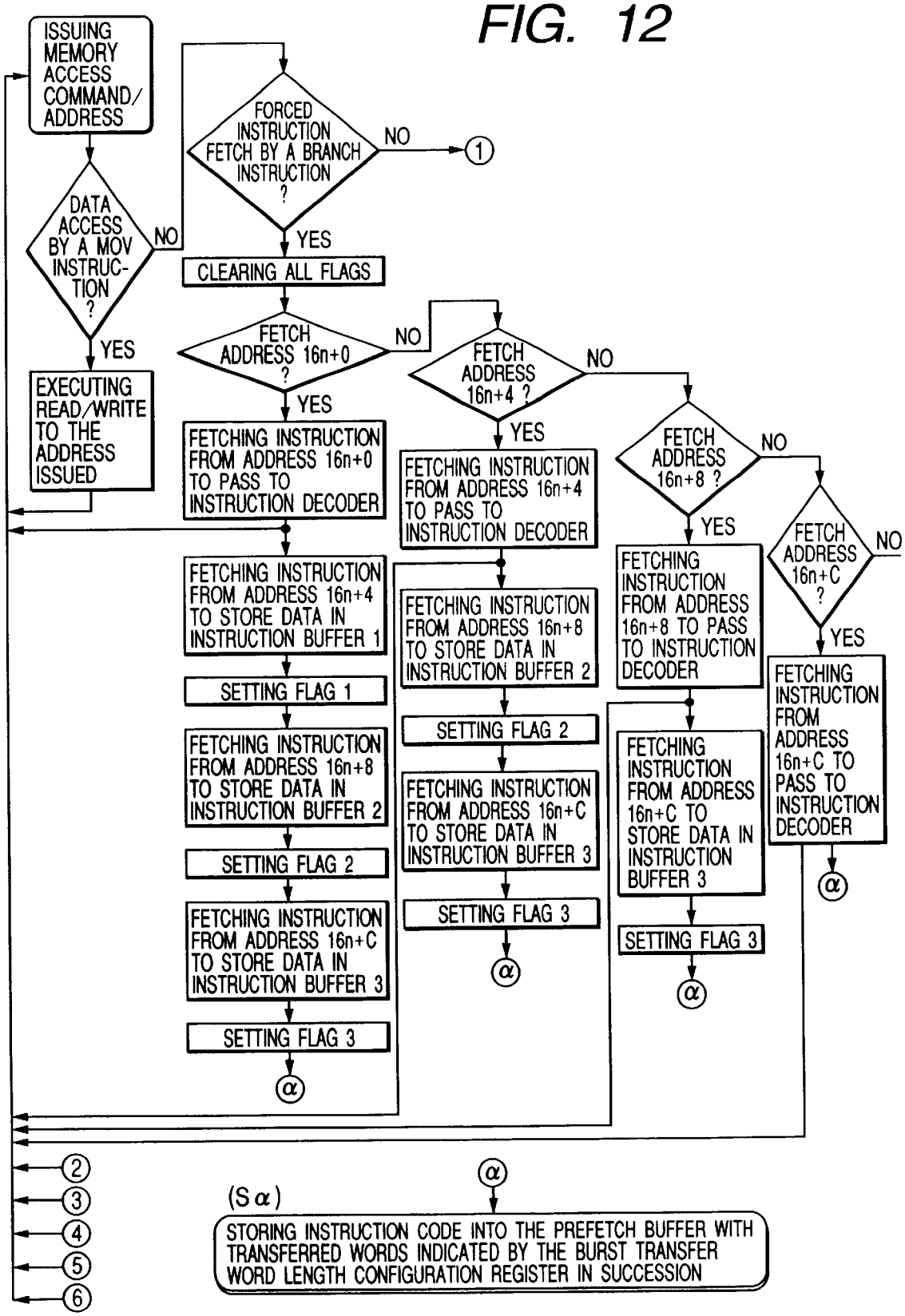
FIG. 12 is a flowchart of steps which are continued to FIG. 13 and which constitute instruction fetch and prefetch control procedure performed by the data processor.
Figure 13:
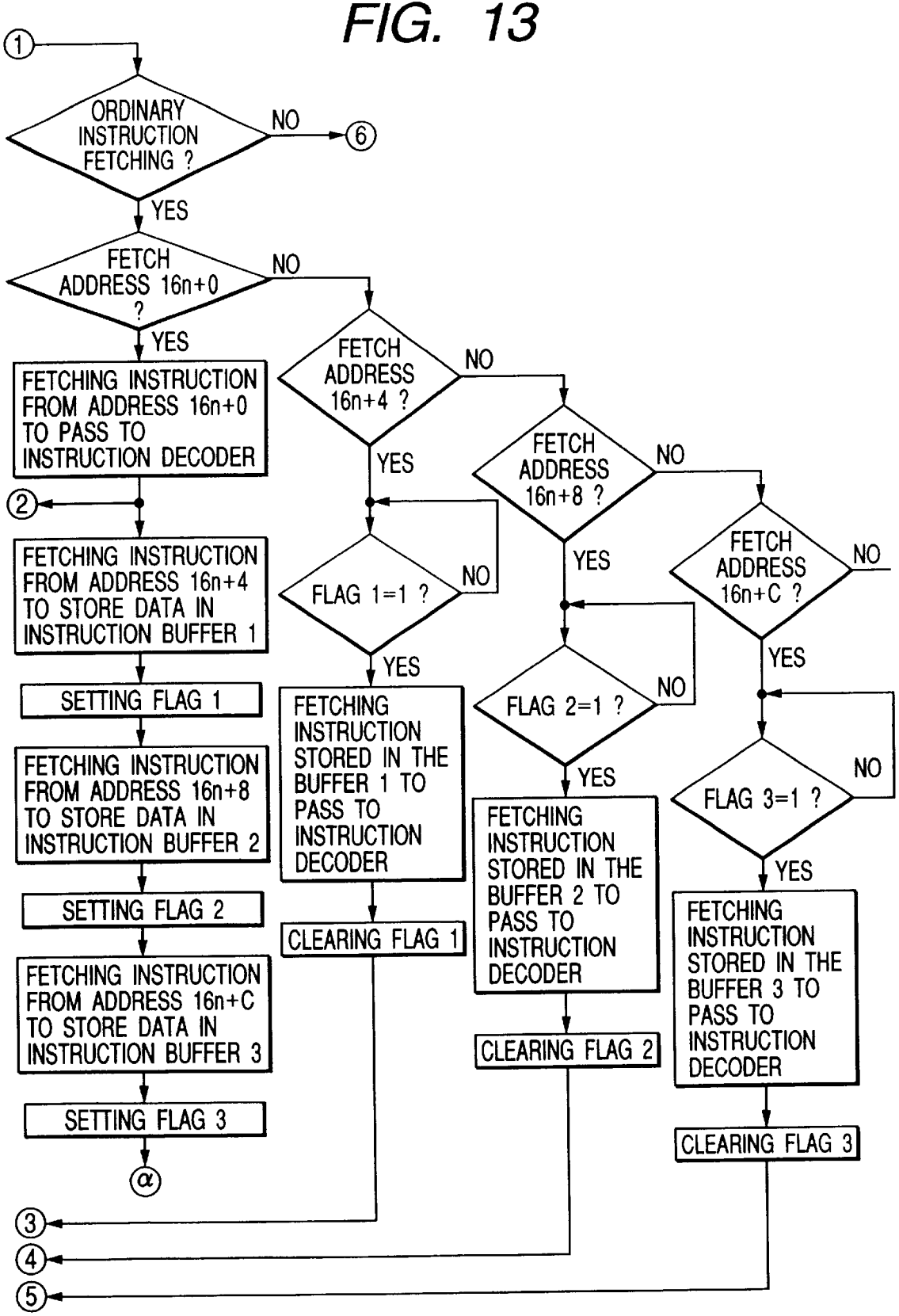
FIG. 13 is a flowchart of steps which are continued from FIG. 12 and which constitute instruction fetch and prefetch control procedure performed by the data processor.

FIG. 12 and FIG. 13 show controlling steps in the instruction fetch and instruction prefetch operations carried out by the data processor 100 in accordance with the present invention. The controlling steps shown in FIG. 12 and FIG. 13 are almost same as those shown in FIG. 3 and FIG. 4 when compared, except for that the number of instructions to be stored is increased (Sα) due to the increase number of the instruction buffers.

Figure 14:
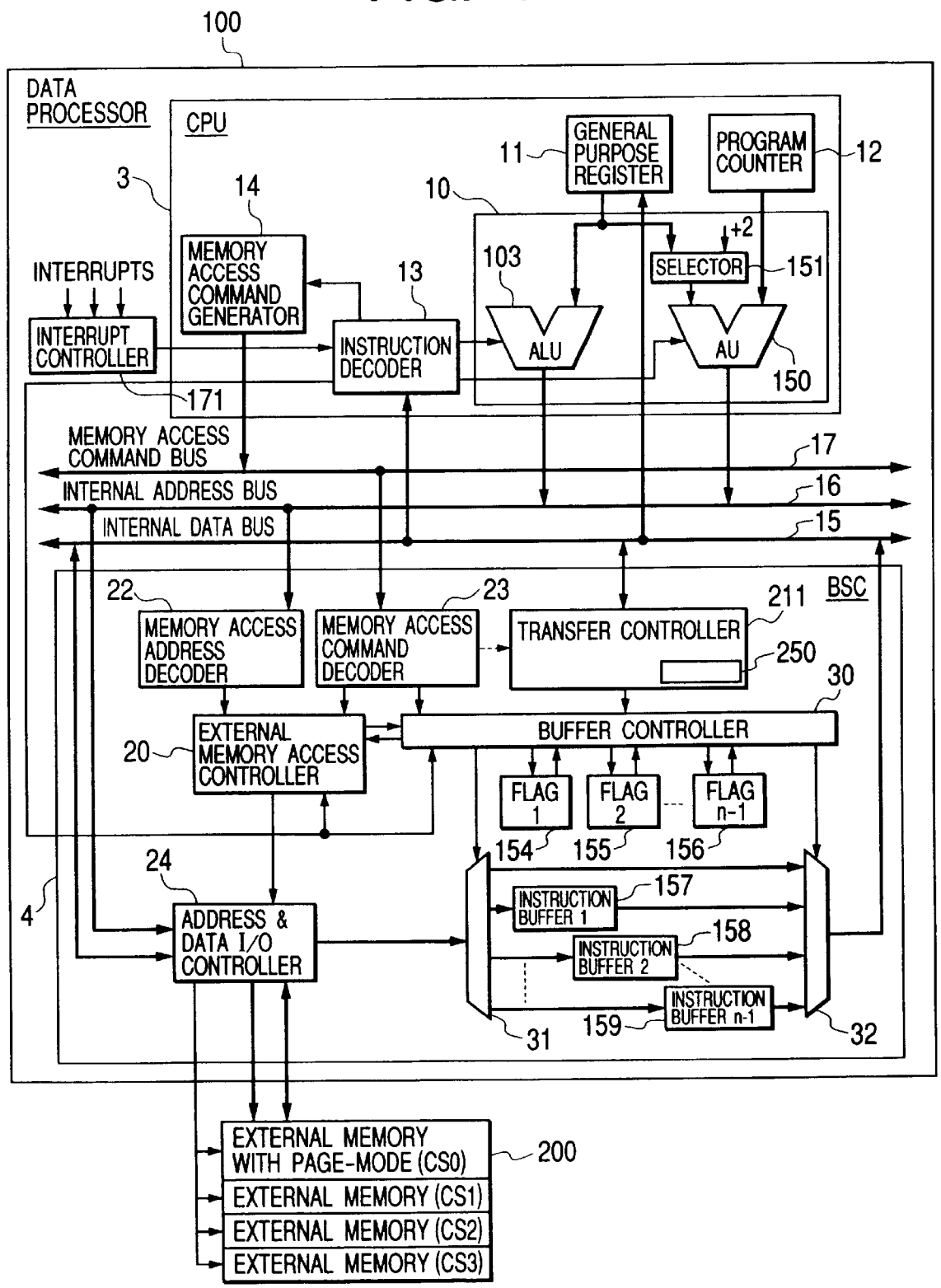
FIG. 14 is a schematic block diagram illustrating still another exemplary data processing system including a data processor in accordance with the present invention.

FIG. 14 shows another example of the data processing system in accordance with the present invention. The data processing system shown in FIG. 14 may be served preferably in case in which interrupt handling by the CPU 3 is required for some reason. Executing the interrupt handling may result in the discontinued instruction addresses of the instructions to be performed by the CPU 3 in a similar manner to the case in which branching is directed by a branch instruction.

The interrupt controller 171 will accept various interrupts issued thereto for a number of reasons and notice the CPU 3 of the fact that there is an interrupt request. The instruction decoder 105 then will inform (153) the bus controller 4 of the fact that there is an interrupt requested by the interrupt controller 171, and that the interrupt handler program is to be executed. In response to the notice the buffer controller 30 will start executing the same process as the one for a branch requested by a branch instruction.

Figure 15:
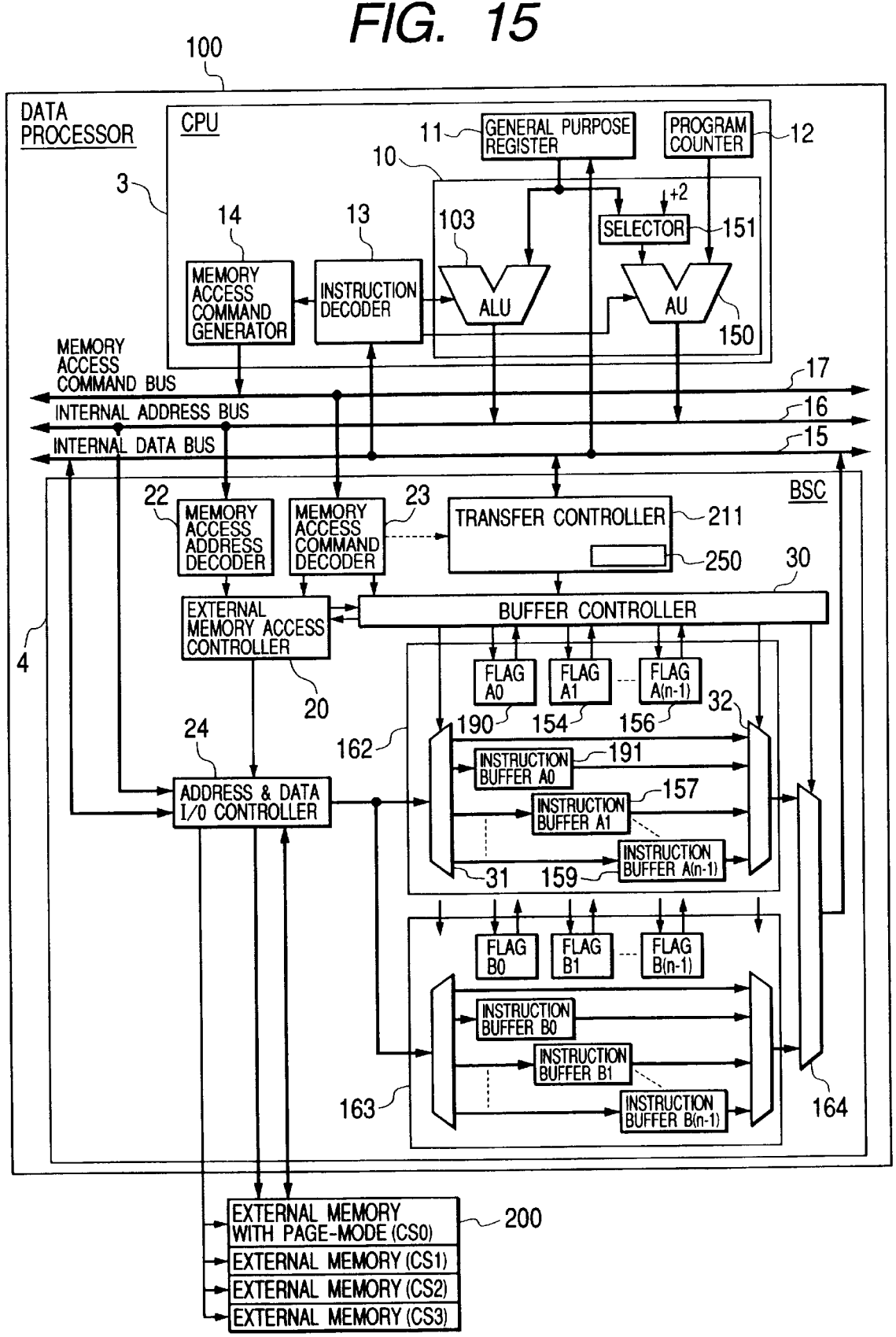
FIG. 15 is a schematic block diagram illustrating yet another exemplary data processing system including a data processor in accordance with the present invention.

FIG. 15 shows another exemplary data processing system in accordance with the present invention. The data processing system shown in FIG. 15 has two prefetch buffer tables (162 and 163) each including n-buffers for instructions. The buffer controller 30 will be controlled so as to execute a fetch of instruction from the external memory 200 while one of the prefetch buffer table 162 is being used by the CPU 3 to store the instruction being fetched into the instruction buffer in the prefetch buffer table 163. More specifically, The CPU 3 will fetch all instructions stored in the instruction buffers (191, 157, and 159) of the prefetch buffer table 162, and will perform the following instruction fetch thereafter from within the instruction buffers in the prefetch buffer table 163 so as to load any instructions fetched from the external memory 200 into the instruction buffers in the prefetch buffer table 162. In case in which the CPU 3 fetches all of instructions loaded in the instruction buffers in the prefetch buffer table 163, the role of those buffers will be reversed.

Figure 16:
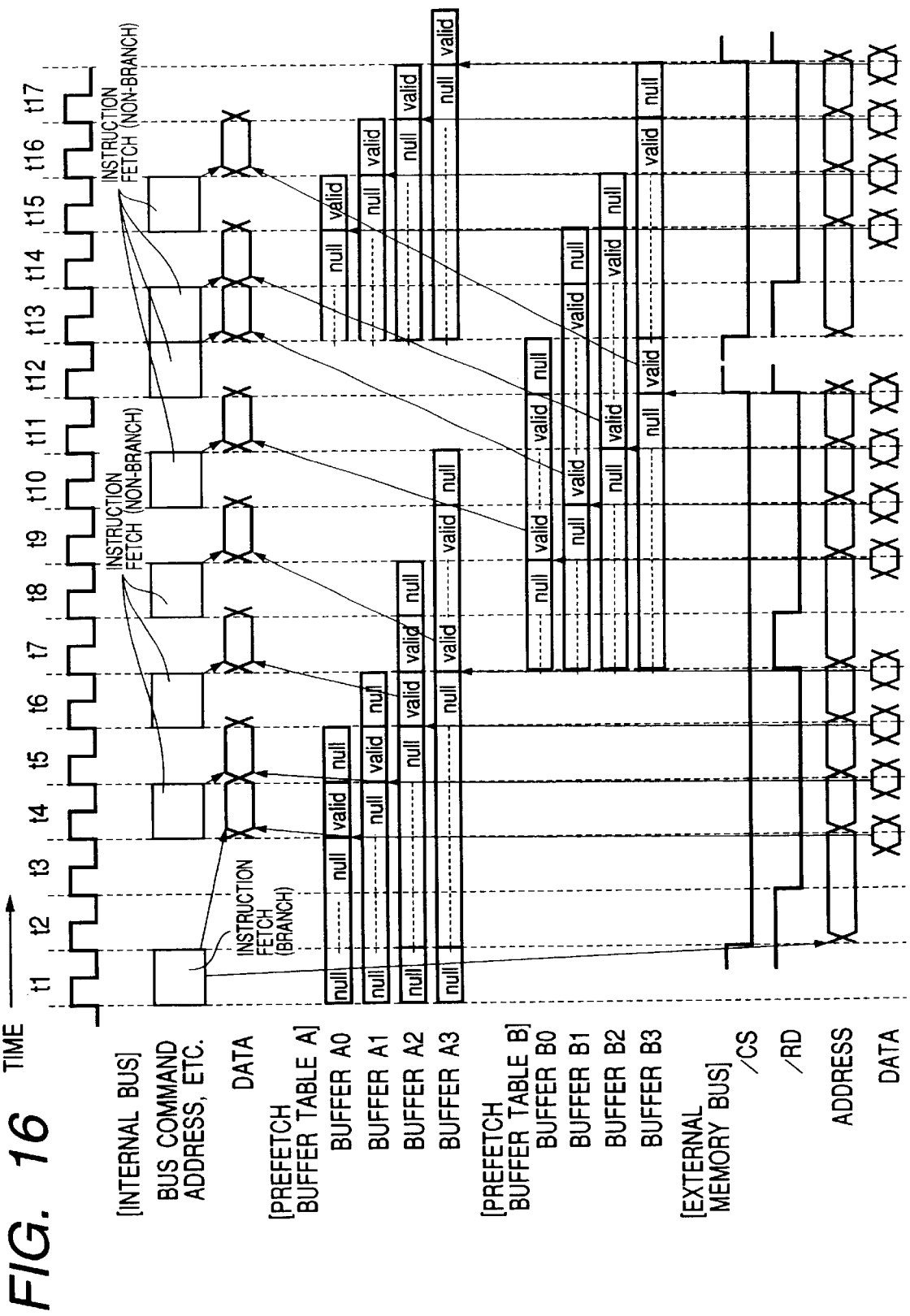
FIG. 16 is a timing chart showing instruction fetches by the data processor, instructions being stored in the instruction buffers, and access to the external memory when there are provided a plurality of prefetch buffer tables shown in FIG. 15.

FIG. 16 shows a timing chart with respect to the switching of the prefetch buffer tables. At the time t1, an instruction fetch of a branch instruction will be performed. The bus controller 4 will perform access to the external memory 200 to seek the instruction address of branch destination to store into the instruction buffers of the prefetch buffer table 162 (prefetch buffer table) the instructions supplied from the external memory 200 during the period in the range from the time t4 to t6. At the time t8, where the last one of the instructions stored in the last instruction buffer A3 of the prefetch buffer table A will have been fetched. Then for the instruction addresses which follows, the corresponding instructions supplied by the external memory 200 will be loaded to the instruction buffers in the prefetch buffer table 163 (prefetch buffer table B) during the period from the time t9 to the time t12. In this manner the instruction stored in the instruction buffer B0 of the prefetch buffer table B will be immediately replied in response to the instruction fetch issued at the time t10, allowing the CPU 3 not to wait for the succeeding instruction to be supplied from the external memory 200.

The addresses to be output to the address bus of the external memory in order to read out instructions from the external memory 200 will be described in greater details below.

In case of instruction fetch of a branch instruction at the time t1, the address of the instruction to be supplied will be output to the address bus of the external memory by the bus controller unit 4, which unit generates the address by making use of the information output by the CPU 3 to the internal bus. On the other hand, when an instruction is to be fetched following a non-branch instruction at the time t8, the address of the follower instruction may be calculated based on the internal information of the buffer controller 30. Therefore, it becomes possible that the instruction address of the instruction to be supplied in advance be output before the information output to the internal bus will be sent.

FIG. 17 shows the operation with a plurality of prefetch buffer tables. When an instruction fetch is output from the CPU 3 on the basis of a branch instruction (FIG. 17(A)), the external memory will be accessed to read out and then the instruction fetch by the CPU 3 will be performed in parallel to writing the instructions being read out from the external memory into the instruction buffers. In this case, to write to the prefetch buffer tables may be desirable, but not limited to store instructions in the prefetch buffer table of the side of the least recent use. When an instruction fetch is to be executed by a non-branch instruction (FIG. 17(B)), after waiting for the corresponding flags associated with the instruction buffers designated to by the lower bits of the instruction addresses to become valid, the instruction will be fetched by the CPU 3, and then the flags will be reset to invalid. If there exists a prefetch buffer table from which all instructions have been already fetched (i.e., which is empty), regardless of whether the CPU 3 outputs an instruction fetch or not, the read-out operation of the external memory 200 will be performed onto the addresses next to the one for which the last instruction fetch has been executed, to store instructions thus read out from the external memory into the instruction buffers of the empty prefetch buffer table and then to set the appropriate corresponding flags to the valid state.

Figure 18:
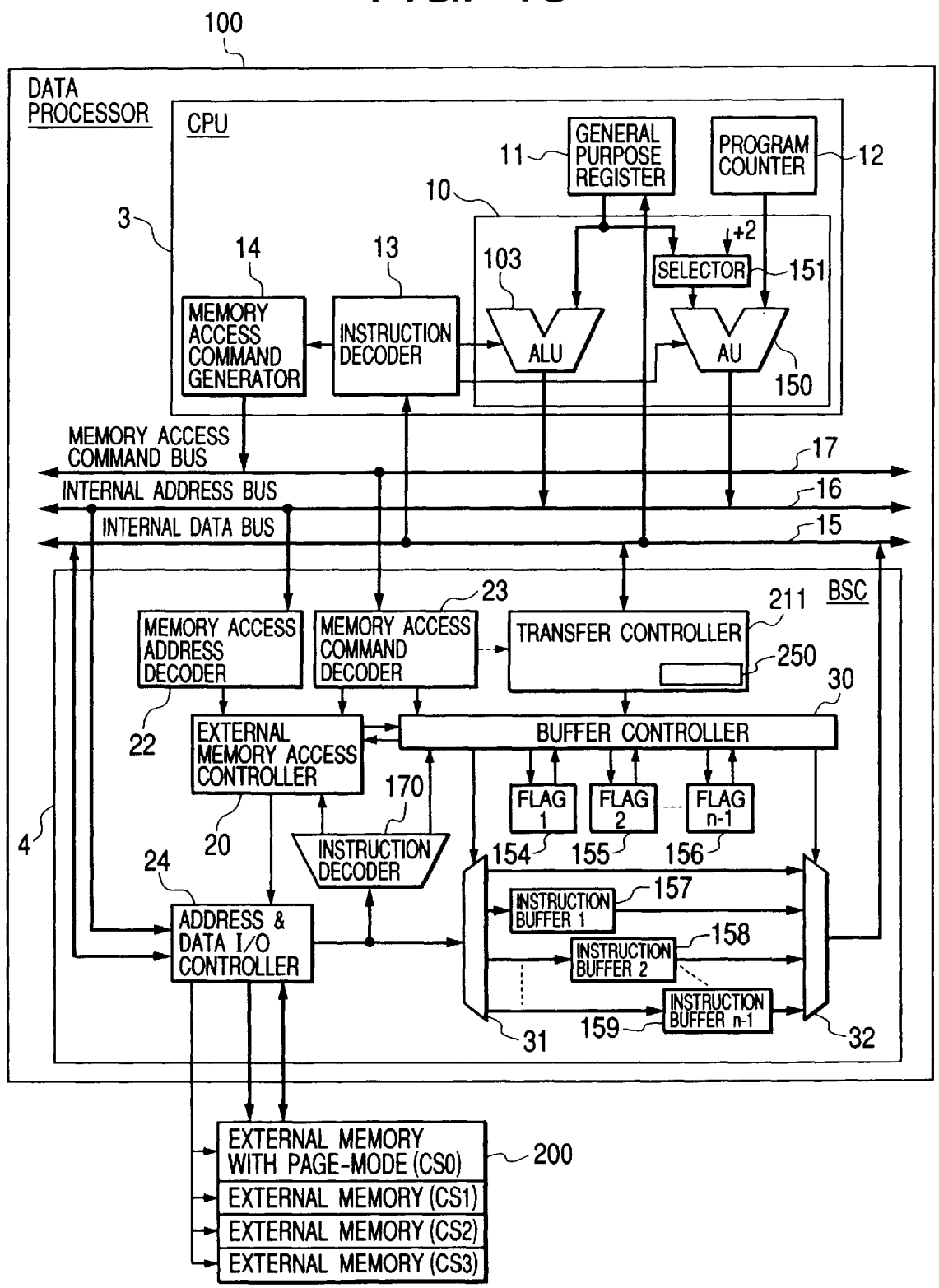
FIG. 18 is a schematic block diagram of an alternative exemplary data processing system including a data procedure in accordance with the present invention.

FIG. 18 shows another typical example of a data processing system in accordance with the present invention. The data processing system shown in FIG. 18 comprises an instruction decoder 170 for determining whether the instruction read out from the external memory 200 is a branch instruction or a non-branch. Whether the instruction to be read from the external memory 200 is a branch instruction or a non-branch instruction will be determined by the instruction decoder 170, and if it is determined to be a branch instruction then the instructions following that branch instruction will be aborted to read.

Figure 19:
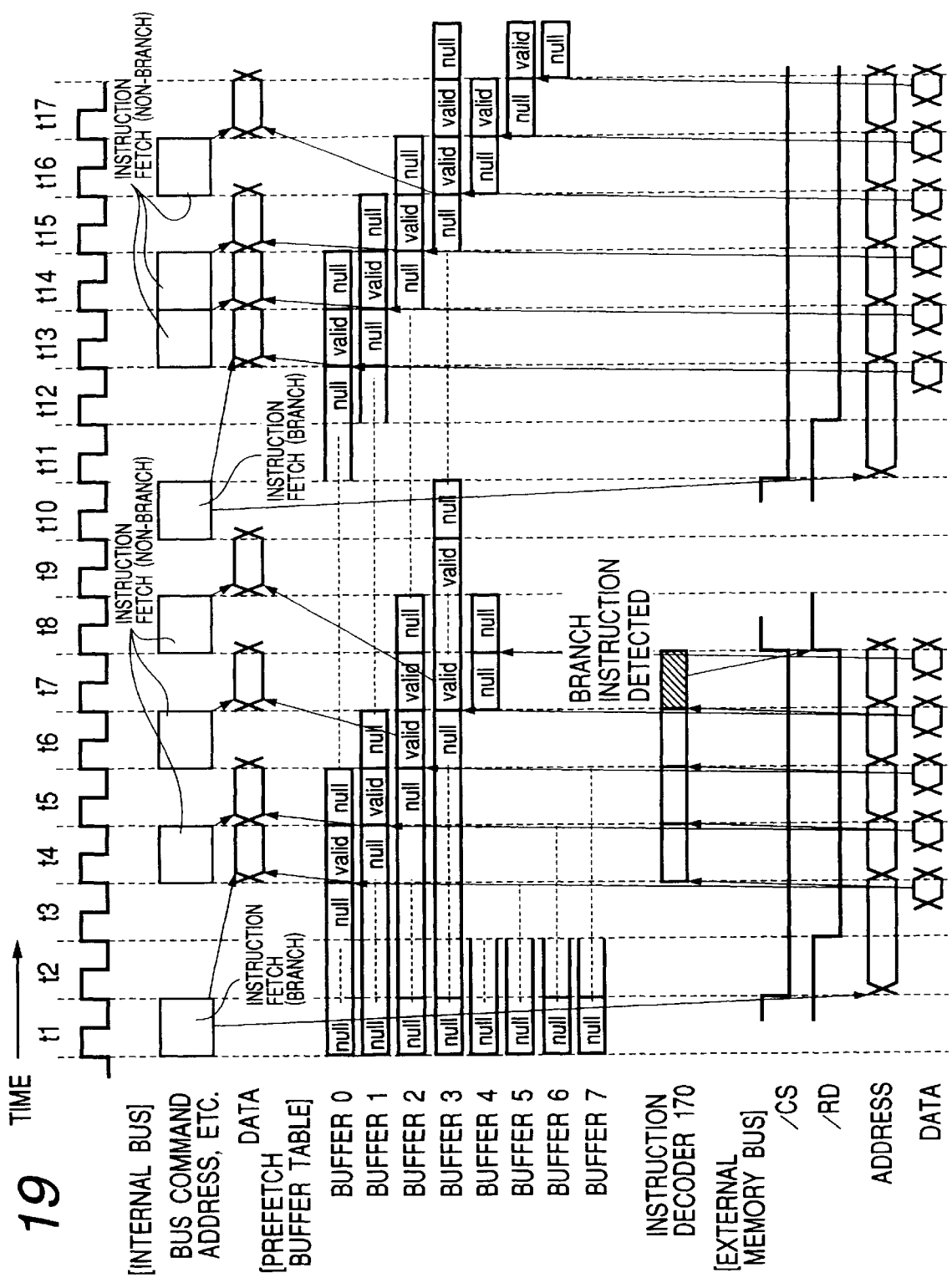
FIG. 19 is a timing chart showing instruction fetches by the data processor, instructions being stored in the instruction buffers, and access to the external memory, along with the detection of a branch instruction, when there is provided an instruction decoder shown in FIG. 18.

FIG. 19 shows a timing chart for the determination of branch instruction by the instruction decoder 170.

In the reading operation starting at the time t3, of instruction from the external memory 200, if an instruction read out at the time t7 is determined to be a branch. The reading operation from the external memory 200 (i.e., burst transfer) will be aborted. After the branch destination address designated to by a branch instruction will be specified at the time t10, the next read operation of instructions (at the time t12) will be started over.

The abortion of the reading operation of instructions from the external memory 200 may alternatively be triggered by the detection of interrupt request, rather than a branch instruction detected by the instruction decoder 170. The reason is that, when detecting an interrupt request, as have been described above with reference to FIG. 14, the instruction addresses to be executed by the CPU 3 will become discontinuous thereby, as similar to the case of branching due to the branch instruction.

Figure 20:
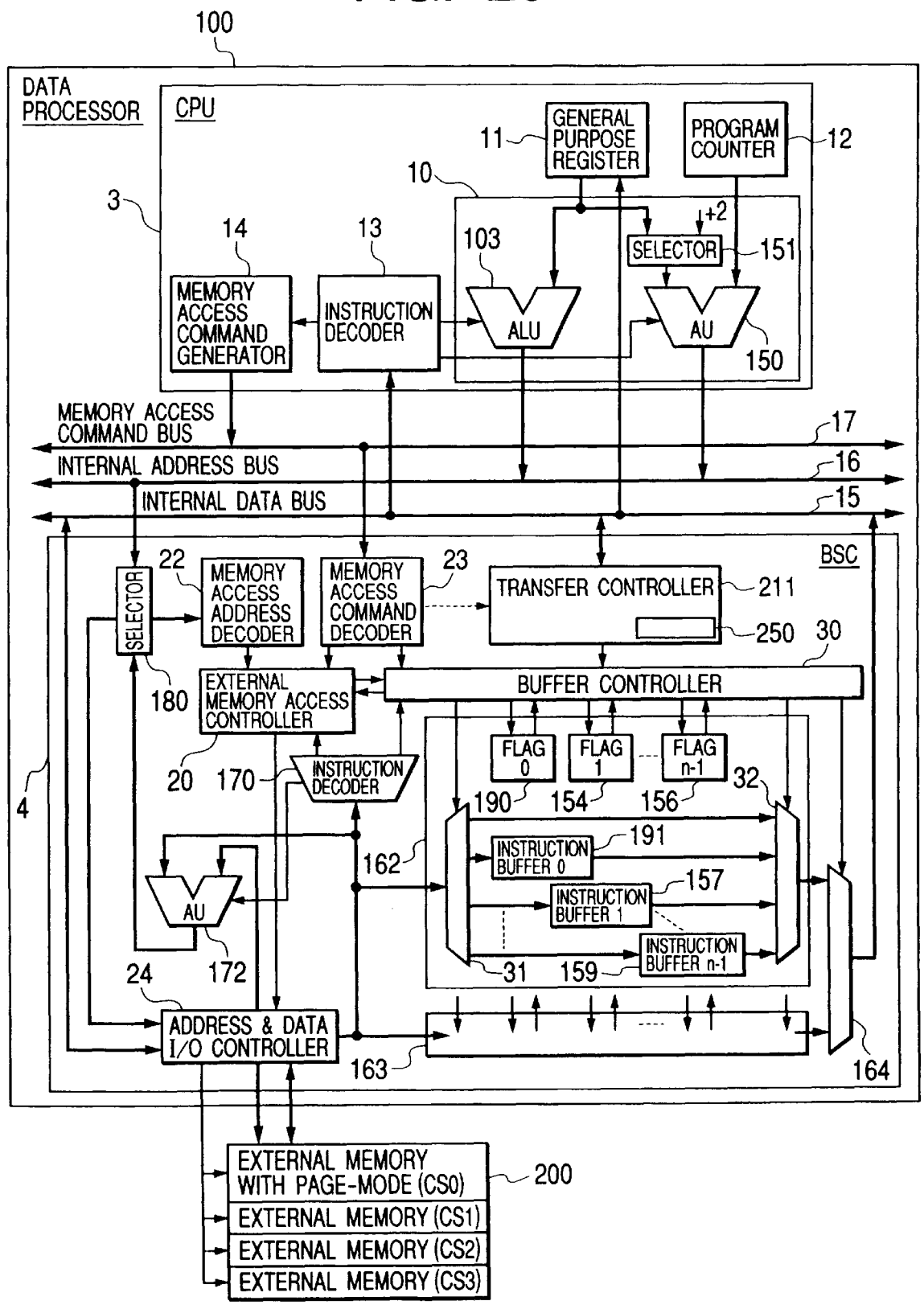
FIG. 20 is a schematic block diagram of a yet another example of a data processing system including a data processor in accordance with the present invention.

FIG. 20 shows a typical example of an alternative data processing system in accordance with the present invention. The data processing system shown in FIG. 20 comprises an instruction decoder 170 for determining whether the instruction being read from the external memory 200 is a branch instruction or a non-branch instruction, and an address calculator 172 for calculating the branch destination address to which the routine jumps by the preceding branch instruction.

Figure 21:
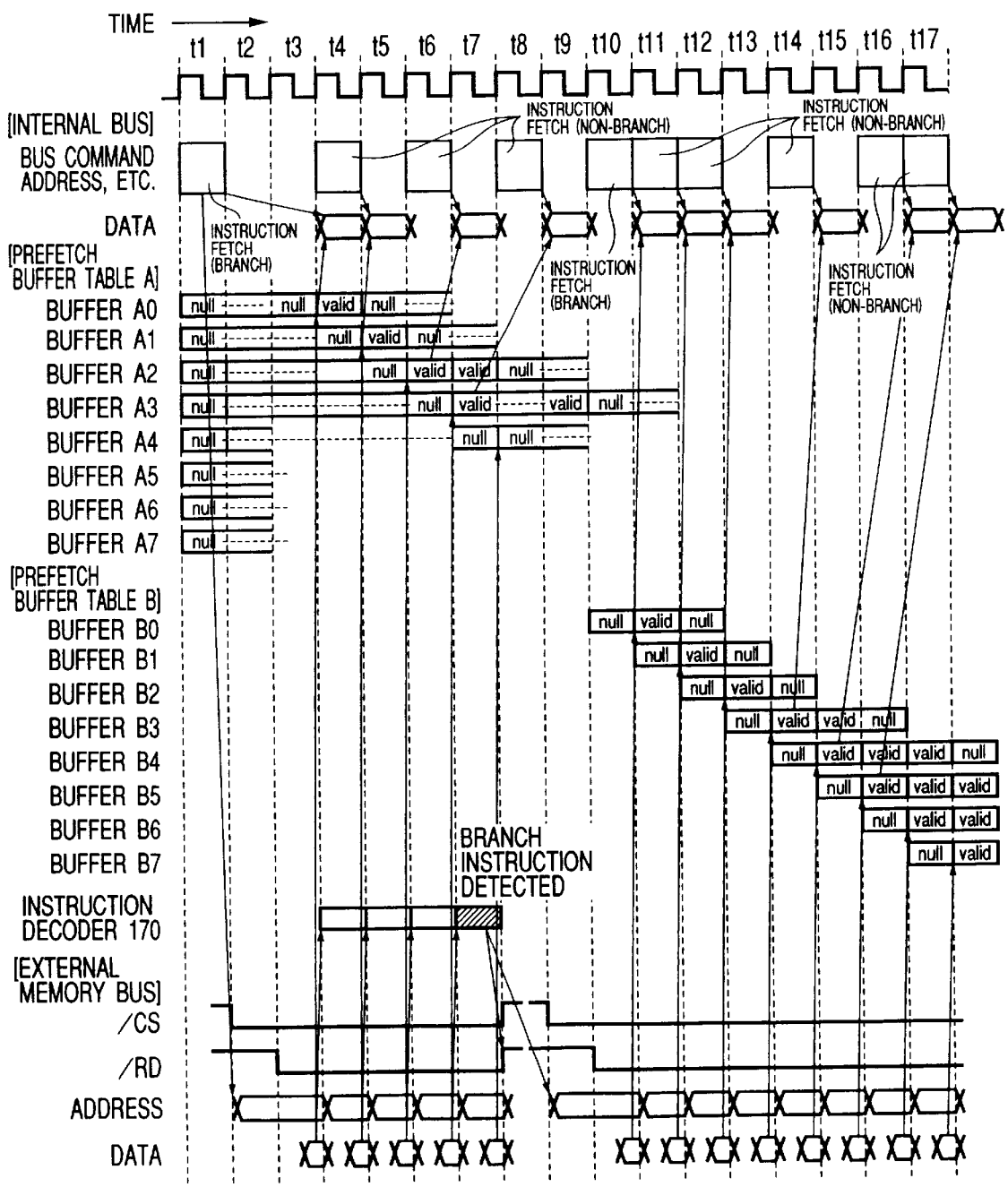
FIG. 21 is a timing chart showing instruction fetches by the data processor, instructions being stored in the instruction buffers, and access to the external memory, along with the detection of a branch instruction, when there is provided an address calculator shown in FIG. 20.

FIG. 21 shows a timing chart illustrating a case in which a branch instruction is determined by the instruction decoder 170 and the address calculation is performed by the address calculator 172. In the reading operation of instructions from the external memory 200 beginning at the time t3, if an instruction being read at the time t7 is determined to be a branch, then the reading operation from the external memory 200 (burst transfer) will be aborted, and the reading operation of instructions from the external memory 200 for the branching destination address calculated by the address calculator 172 will be executed at and after the time t10. This allows the CPU 3 not to suspend the execution of instructions for reading instructions of the branch destination address.

When determining whether an instruction is a branch or not by means of the instruction decoder 170, it may be possible to have the decoder determine whether the branch instruction of the interest is either a unidirectional branch instruction or a bidirectional branch. If the branch instruction in question is unidirectional, then there is always a branch to the branch destination address. However, if the instruction in question is bidirectional, the following operation will be either a branch to the branch destination address, or the execution of an instruction in the instruction address next thereto without branching.

If the branch instruction thus detected is a unidirectional one, then the reading operation will be aborted at the instruction immediately following the branch instruction in question. On the other hand if the branch instruction is bidirectional then the operation may be controlled such that the instruction immediately following the branch instruction, along with the instruction at the branch destination address to which the program will branch due to the branch instruction will be stored in their respective prefetch buffer tables. Whether a branch will be performed or not in response to a bidirectional branch instruction, may not affect to the CPU 3 since the instructions to be executed by the CPU 3 will be already loaded in the prefetch buffer tables, and no time will be needed for waiting for the instructions to be read out from the external memory 200. The instructions loaded in the prefetch buffer table, which will not be executed, may be set to invalid at the time when these instructions are ensured not to be used.

In case of bidirectional branch instructions, it should consider how many instructions following a branch instruction and instructions at the destination addresses of branch target are to be prefetched. Approximately two for each will be sufficient but not limitative. After detecting a branch instruction, when two instructions following the branch instruction in question or so are read out, the reading operation from the external memory 200 will be once aborted to read out two instructions at the destination addresses thereafter. With two instructions read out previously, at the time when the exact instruction to be executed is determined, the execution of instructions will not be affected by the reading operation if other instructions that follow are to be loaded from the external memory 200. More specifically, the number of both instructions to be prefetched may be determined by taking into consideration the time needed for executing an instruction in the CPU 3 along with the time required for loading an instruction from the external memory 200.

Figure 22:
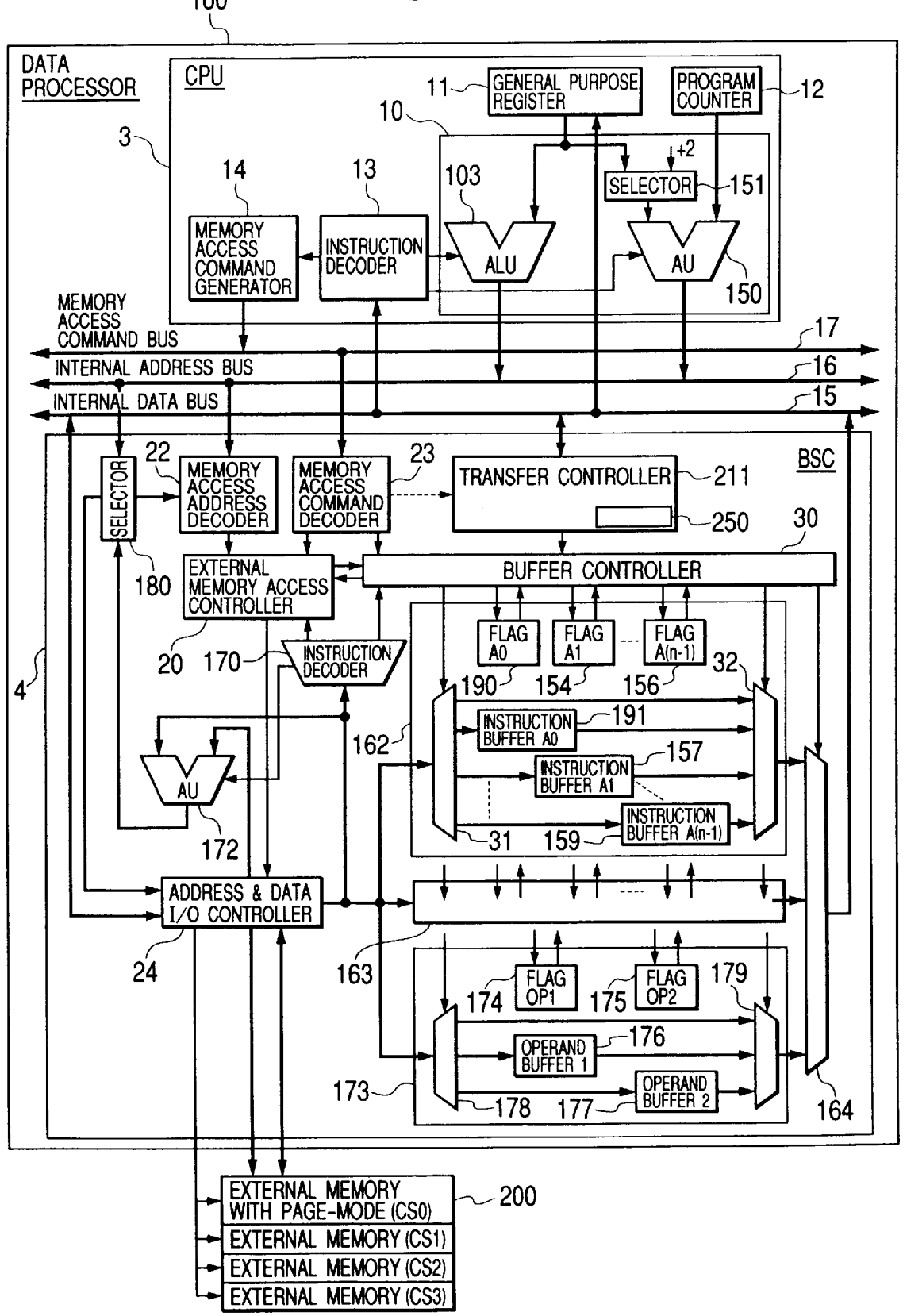
FIG. 22 is a schematic block diagram of a still another example of a data processing system including a data processor in accordance with the present invention.

FIG. 22 shows still another typical example of the data processing system in accordance with the present invention. The data processing system shown in FIG. 22 has operand buffers (176, and 177) in addition to a prefetch buffer table.

Figure 23:
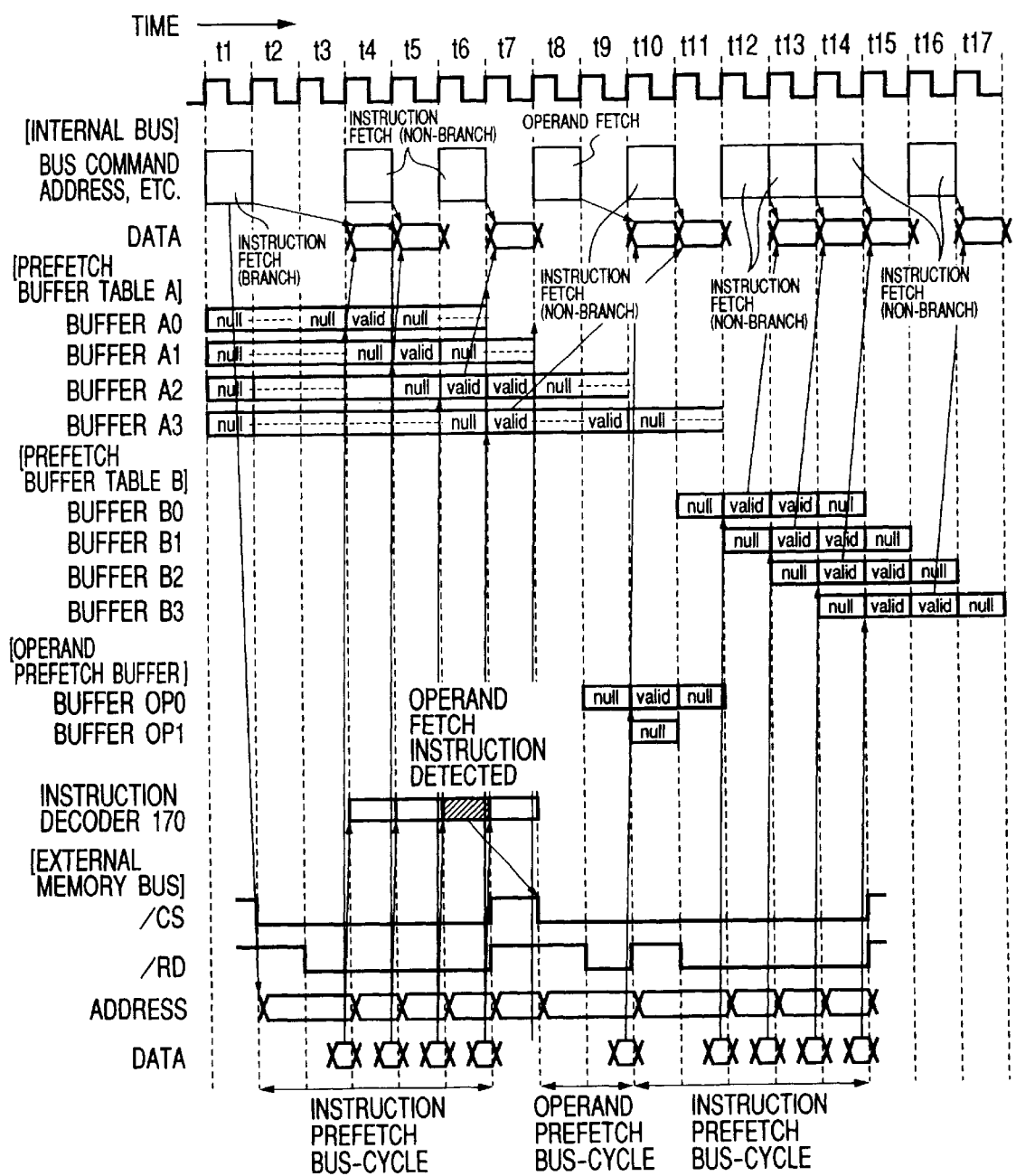
FIG. 23 is a timing chart showing instruction fetches by the data processor, instructions being stored in the instruction buffers, and access to the external memory, along with the detection of an operand fetch instruction, when there is provided an operand fetching facility shown in FIG. 22.

FIG. 23 shows a timing chart of the system having operand buffers (176 and 177). When an instruction requiring reading operation of the address designated to by an operand from the external memory 200 is detected by the instruction decoder (at the time t6), the address calculator 172 will calculates the address indicated by the operand to read out the appropriate operand data from the external memory 200 (t9) to store the data thus read out from the external memory 200 into the operand buffers (176 and 177). In this manner the duration of suspended execution of the CPU 3 will be shortened when compared with the scheme in which the access to the external memory 200 will be executed after the operand fetch done by the CPU 3 (at the time t8). After the completing the operation of operand data read out, the system may continue to read out other data required by following instructions.

Figure 24:
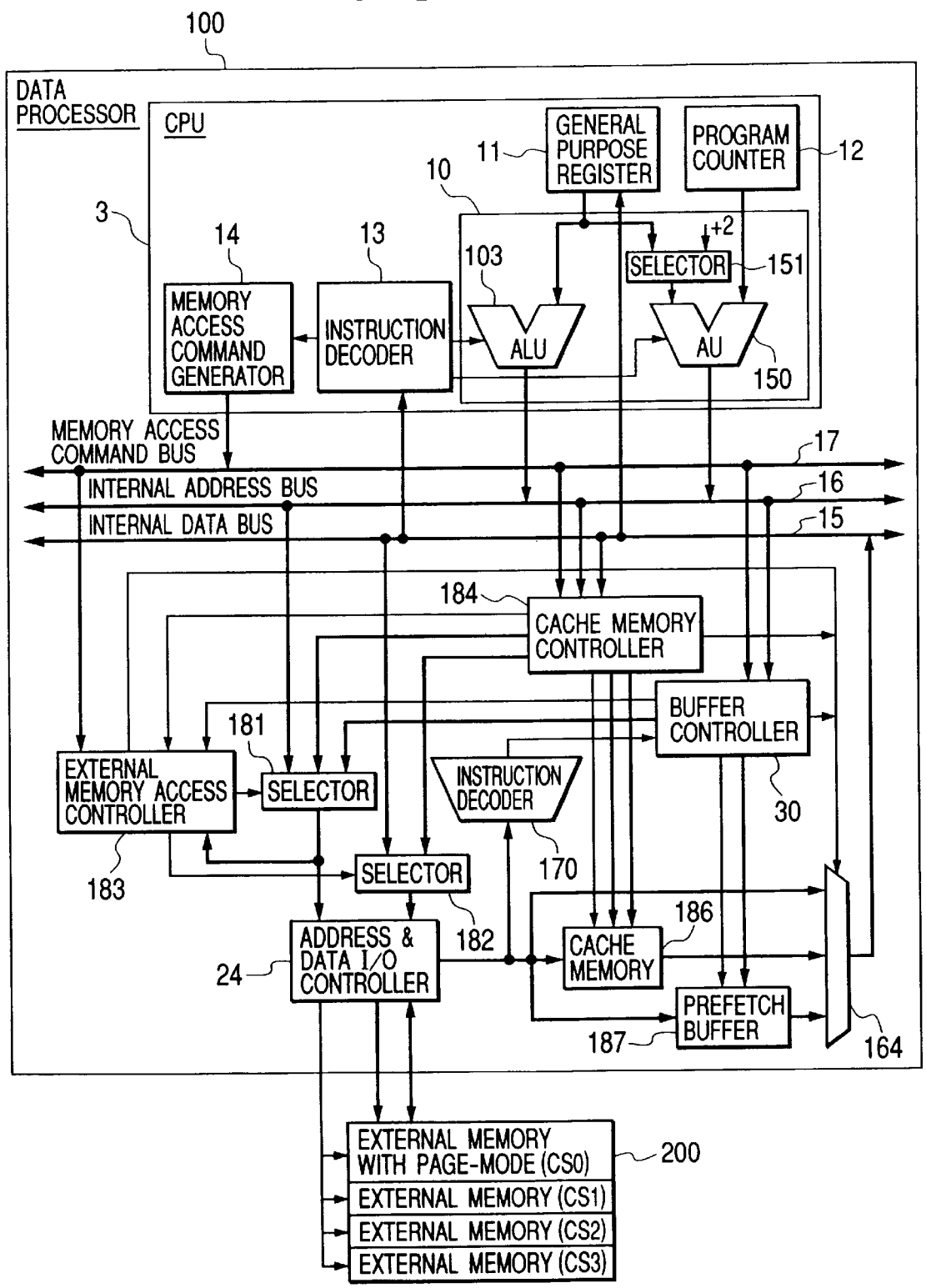
FIG. 24 is a schematic block diagram of yet another example of a data processing system including a data processor in accordance with the present invention.

FIG. 24 shows another typical example of the data processing system in accordance with the present invention. The data processing system shown in FIG. 24 has additionally a cache memory along with the prefetch buffers. In the protocol handling process that may relatively have few branches and few loops, it will be difficult to further improve the processing efficiency only with the cache memory. The prefetch buffers may be then advantageous along therewith. However, using only the prefetch buffers will require access to the external memory 200 even in case of branch or loop to an address at which the instruction has been already executed. In such circumstances, the cache memory will be beneficial. Furthermore, not only the branches and loops in a protocol handling process but also the protocol handling process itself may be iteratively executed with a predetermined certain interval. Although it is not practical to store all of the programs needed in a cache memory, if part of a program at least is loaded in the cache, the part requires no access to the external memory 200, so that the cache may be considered to be effective for that part. Therefore, it may be reasonable that the instructions stored in the cache will be read out from the cache, while on the other hand the instructions that are not loaded into the cache will be prefetched from the external memory 200 by using the prefetch buffers.

It will be better incorporating the instruction decoder 170 and the address calculator 172 both shown in FIG. 20 into the prefetch buffers in order to detect the branches as well as to calculate the address to be branched. In case in which a branch is to be executed to a target address lower than the one that is being executed at that moment, the instruction at the branch target address may be loaded in the cache memory at higher probability. Therefore, the instructions stored in the cache memory may be read out if these instructions are there by suspending the instruction prefetch and by checking to see by the cache memory controller 184 whether the appropriate instructions of interest exist in the cache memory. In either case in which the branch destination address is higher than the one that is being executed at that moment, or the instructions required are not stored in the cache memory, then the instruction prefetch will be executed from the branch destination address.

It is to be understood by those skilled in the art that the present invention is not to be limited to the details herein given but may be modified within the scope of the appended claims.

For example, it may be appreciated by those skilled in the art that the data processor may incorporate some other circuit modules in addition to the instruction executing means such as the CPU and the bus controller. More specifically, the data processor may have a memory management unit, a floating-point unit, a product-sum unit, a cache memory for data, a direct memory access (DMA) controller, and a timer-counter as needed.

It is also possible not to prefetch when a branch destination instruction is fetched by a branch instruction. While it is desirable that the size of memory buffer be equal to the length of instructions, which may be of a unity of instruction fetch, in view of simplifying the instruction fetch and prefetch, this is not limitative of the invention. Alternatively, each of instruction buffers used may have a capacity the integer times larger than the size of instructions to be fetched.

In the above description, although the present invention has been illustrated and described by way of example when applied to a cellular phone system, which falls in the background thereof studied by the inventors, the present invention may be embodied in other specific forms without departing from the spirit or essential characteristics thereof. For instance, the present invention may be broadly applied to data processing systems including any other communication terminals and portable data terminals.

The major benefits of this invention are recapitulated as follows.

For instance, a relatively simple structure of the data processor in accordance with the present invention allows instructions from an external source to be prefetched, to thereby improve the efficiency of execution.

The processes having few loop instructions that exclusively executes in a sequential manner the instructions at linear and continuous addresses by fetching them may be accelerated by implementing the instruction prefetch facility having relatively simple architecture of instruction prefetch, in accordance with the present invention.

According to the present invention, the efficiency of data processing may be further improved at a relatively lower cost, in a data processing system that executes subroutines having few branches that need to change the sequential execution order of instructions in successive instruction addresses.

What is claimed is:

1. A data processor, comprising:
   an instruction execution unit which fetches instructions, decodes thus fetched instructions, and executes thus fetched and decoded instructions; and
   a bus controller for controlling access to an external bus in response to a command from said instruction execution unit,
   said bus controller having a plurality of instruction buffers, a flag specific to each of instruction buffers, and a buffer controller circuit;
   said buffer controller circuit being served for allocating to each of said instruction buffers one of specific values that plural lower bits of an instruction address may take, prefetching instructions to the instruction buffers each corresponding to a respective addresses designated to by said plural lower bits, from the address following a predetermined fetch address, setting the appropriate flag to valid in correspondence with the instruction prefetch, and setting the appropriate flag to invalid in response to the output of instructions prefetched.

2. A data processor according to claim 1, wherein:
   said buffer controller circuit outputs to said instruction execution unit the instruction in the instruction buffer under the condition that the flag of the corresponding instruction buffer allocated in correspondence with the value of said plural lower bits of the instruction address of the instruction to be fetched by said instruction execution unit is set to valid.

3. A data processor according to claim 2, wherein:
   said buffer controller circuit enables the instruction prefetch to be performed to the corresponding instruction buffer under the condition that said flag is set to invalid.

4. A data processor according to claim 3, wherein:
said buffer controller circuit initializes all of said flags to set to invalid, in response to the instruction by said instruction execution unit of change of the order of execution of sequential instruction addresses.

5. A data processor according to claim 4, wherein:
said instruction buffer contains bits as a unit number of instruction fetched by said instruction execution unit.

6. A data processor, comprising:
an instruction execution unit which fetches instructions, decodes thus fetched instructions, and executes thus fetched and decoded instructions; and
a bus controller which controls access to an external bus in response to the direction by said instruction execution unit,
said bus controller having a plurality of instruction buffers each holding bits of an instruction fetched by said instruction execution unit, a flag for each of instruction buffers, and a buffer controller circuit;
said buffer controller circuit being served for allocating to each of said instruction buffers one of specific values that plural lower bits of an instruction address may take; prefetching, when an instruction is fetched which has a start address indicated by said plural lower bits, instructions to the instruction buffers corresponding to the address order in the range from the address that follows to the starting instruction address of fetched instruction designated to by said plural lower bits to the final address of instructions indicated by said plural lower bits; prefetching, when an instruction fetch is performed by a branch instruction for an instruction at the branch destination address, instruction to the instruction buffers corresponding to the address order to the addresses in the range from the address following the address of the fetched instruction to the final address indicated by said plural lower bits; setting the appropriate flag to valid in response to the instruction prefetch; outputting to said instruction execution unit the instruction in the instruction buffer under the condition that the flag of the corresponding instruction buffer allocated in correspondence with the value of said plural lower bits of the instruction address of the instruction to be fetched by said instruction execution unit is set to valid.

7. A data processor according to claim 6, wherein:
said buffer controller circuit sets to invalid the flag corresponding to the instruction prefetched into an instruction buffer in response to the output thereof, enables the instruction to be prefetched to corresponding instruction buffers under the condition that said flag is set to invalid, and initializes all of said invalid flags in response to an instruction fetch command according to a branch instruction.

8. A data processing system, comprising:
a data processor, formed on a single semiconductor chip, including:
an instruction execution unit which fetches instructions, decodes thus fetched instructions, and executes thus fetched and decoded instructions; and
a bus controller having a plurality of instruction buffers, a flag for each of instruction buffers, and a buffer controller circuit, for controlling access to an external bus in response to a command from said instruction execution unit; and
a memory for storing operation programs for said data processor, said memory being a target of external bus access by said bus controller;
said buffer controller circuit being served for allocating to each of said instruction buffers one of specific values that plural lower bits of an instruction address may take; prefetching, when an instruction is fetched which has a start address indicated by said plural lower bits, instructions to the instruction buffers corresponding to the address order in the range from the address that follows to the starting instruction address of fetched instruction designated to by said plural lower bits to the final address of instructions indicated by said plural lower bits; prefetching, when an instruction fetch is performed by a branch instruction for an instruction at the branch destination address, instruction to the instruction buffers corresponding to the address order to the addresses in the range from the address following the address of the fetched instruction to the final address indicated by said plural lower bits; setting the appropriate flag to valid in response to the instruction prefetch; outputting to said instruction execution unit the instruction in the instruction buffer under the condition that the flag of the corresponding instruction buffer allocated in correspondence with the value of said plural lower bits of the instruction address of the instruction to be fetched by said instruction execution unit is set to valid.

9. A data processing system, comprising:
a data processor, formed on a single semiconductor chip, including:
an instruction execution unit which fetches instructions, decodes thus fetched instructions, and executes thus fetched and decoded instructions; and
a bus controller having a plurality of instruction buffers each holding bits of instructions to be fetched by said instruction execution unit, a flag for each of instruction buffers, and a buffer controller circuit, for controlling access to an external bus in response to a command from said instruction execution unit; and
a memory for storing operation programs for said data processor, said memory being a target of external bus access by said bus controller;
said buffer controller circuit being served for allocating to each of said instruction buffers one of specific values that plural lower bits of an instruction address may take; prefetching, when an instruction is fetched which has a start address indicated by said plural lower bits, instructions to the instruction buffers corresponding to the address order in the range from the address that follows to the starting instruction address of fetched instruction designated to by said plural lower bits to the final address of instructions indicated by said plural lower bits; prefetching, when an instruction fetch is performed by a branch instruction for an instruction at the branch destination address, instruction to the instruction buffers corresponding to the address order to the addresses in the range from the address following the address of the fetched instruction to the final address indicated by said plural lower bits; setting the appropriate flag to valid in response to the instruction prefetch; outputting to said instruction execution unit the instruction in the instruction buffer under the condition that the flag of the corresponding instruction buffer allocated in correspondence with the value of said plural lower bits of the instruction address of the instruction to be fetched by said instruction execution unit is set to valid, setting to invalid the appropriate flag corresponding to the instruction prefetched into an instruction buffer in response to the output thereof, enabling the instruction to be prefetched to corresponding instruction buffers under the condition that said flag is set to invalid, and initializes all of said flags to invalid in response to an instruction fetch command according to a branch instruction.

10. A data processor, comprising an instruction execution unit which fetches instructions, decodes thus fetched instructions, and executes thus fetched and decoded instructions; and a bus controller which controls access to an external bus in response to a command from said instruction execution unit, said bus controller having a plurality of instruction buffers, a flag specific to each of instruction buffers, a buffer controller circuit, and an instruction decoder unit;

said buffer controller circuit being served for allocating to each of said instruction buffers one of specific values that plural lower bits of an instruction address may take, prefetching instructions to the instruction buffers each corresponding to a respective addresses designated to by said plural lower bits, from the address following a predetermined fetch address, setting the appropriate flag to valid in correspondence with the instruction prefetch, and setting the appropriate flag to invalid in response to the output of instructions prefetched;

said instruction decoder unit decoding instructions to be stored in said instruction buffers;

said bus controller suspending instruction prefetch if the instruction decoded belongs to a first type of instruction until said instruction will be output from said instruction buffers.

11. A data processor according to claim 10, wherein:

said first type of instruction is a branch instruction.

12. A data processor according to claim 11, wherein:

said bus controller further includes an address calculator;

said address calculator calculates the target address of branch destination of said branch instruction; and instructions will be prefetched starting from said target address of branch destination.

13. A data processor according to claim 12, wherein:

said plurality of instruction buffers as well as flags specific to each of instruction buffers are classified into either a first buffer table or a second buffer table;

instructions prior to said branch instruction are prefetched into the instruction buffers included in said first buffer table, while instructions after the branch are prefetched into the instruction buffers included in said second buffer table, starting from said target address of branch destination.

14. A data processor according to claim 13, wherein:

instructions up to the one in a predetermined address immediately following said branch instruction are prefetched into the instruction buffers included in said first buffer table, while instructions in the range from the one in the target address of branch destination up to the one in a predetermined address are prefetched into the instruction buffers included in said second buffer table.

15. A data processor comprising:

an instruction execution unit which fetches instructions, decodes thus fetched instructions, and executes thus fetched and decoded instructions; and a bus controller which controls access to an external bus in response to a command from said instruction execution unit, said bus controller having a plurality of instruction buffers, a flag specific to each of instruction buffers, and a buffer controller circuit;

said buffer controller circuit being served for allocating to each of said instruction buffers one of specific values that plural lower bits of an instruction address may take, prefetching instructions to the instruction buffers each corresponding to a respective addresses designated to by said plural lower bits, from the address following a predetermined fetch address, setting the appropriate flag to valid in correspondence with the instruction prefetch, and setting the appropriate flag to invalid in response to the output of instructions prefetched to allow the number of instruction buffers for instructions to be prefetched among said plurality of instruction buffers to be variable.

16. A data processor according to claim 15, wherein:

the number of said instruction buffers for prefetching instructions is determined based on the information configured in a predefined register.

17. A data processor according to claim 15, wherein:

the number of said instruction buffers for prefetching instructions is determined based on the number of non-branch instructions executed prior to the execution of the current branch instruction.

18. A data processor, comprising:

an instruction execution unit which fetches instructions, decodes thus fetched instructions, and executes thus fetched and decoded instructions;

a bus controller which controls access to an external bus in response to the direction by said instruction execution unit; and an interrupt controller, said bus controller having a plurality of instruction buffers, a flag specific to each of instruction buffers, and a buffer controller circuit;

said buffer controller circuit being served for allocating to each of said instruction buffers one of specific values that plural lower bits of an instruction address may take, prefetching instructions to the instruction buffers each corresponding to a respective addresses designated to by said plural lower bits, from the address following a predetermined fetch address, setting the appropriate flag to valid in correspondence with the instruction prefetch, and setting the appropriate flag to invalid in response to the output of instructions prefetched;

wherein instruction prefetch to said instruction buffers may be suspended in response to reception of an interrupt by said interrupt controller.

19. A data processor according to claim 18, wherein:

instruction prefetch to said instruction buffers may be suspended after receiving an interrupt by said interrupt controller, in response to a branch to an instruction address associated with the interrupt handling by said instruction decoder.

20. A data processor, comprising:

an instruction execution unit which fetches instructions, decodes thus fetched instructions, and executes thus fetched and decoded instructions; and a bus controller which controls access to an external bus in response to a command from said instruction execution unit, said bus controller including a first buffer table, a second buffer table, and a buffer controller circuit;

each buffer table including a plurality of instruction buffers and a flag specific to each of instruction buffers;

said buffer controller circuit being served for allocating to each of said instruction buffers included in each of said buffer tables one of specific values that plural lower bits of an instruction address may take, prefetching instructions to the instruction buffers each corresponding to a respective addresses designated to by said plural lower bits, from the address following a predetermined fetch address, setting the appropriate flag to valid in correspondence with the instruction prefetch, and setting the appropriate flag to invalid in response to the output of instructions prefetched;

said buffer controller circuit outputting the instructions prefetched in said instruction buffers included in said second buffer table in response to the output of instructions prefetches in all of instruction buffers included in said first buffer table.

21. A data processor according to claim 20, wherein:

said buffer controller circuit suspends instruction prefetch to said first buffer table in response to the instruction decoded in said instruction execution unit belonging to a first type of instruction, and prefetches instructions to the instruction buffers included in said second buffer table on the basis of instruction address supplied from said instruction execution unit.

22. A data processor, comprising:

an instruction execution unit which fetches instructions, decodes thus fetched instructions, and executes thus fetched and decoded instructions; and a bus controller which controls access to an external bus in response to a command from said instruction execution unit, said bus controller having a plurality of instruction buffers, a flag specific to each of instruction buffers, one or more of data buffers, a flag specific to each of said data buffers, an instruction decoder unit, an address calculator unit, and a buffer controller circuit;

said buffer controller circuit being served for allocating to each of said instruction buffers one of specific values that plural lower bits of an instruction address may take, prefetching instructions to the instruction buffers each corresponding to a respective addresses designated to by said plural lower bits, from the address following a predetermined fetch address, setting the appropriate flag to valid in correspondence with the instruction prefetch, and setting the appropriate flag to invalid in response to the output of instructions prefetched;

said instruction decoder unit decoding instructions to be stored in said instruction buffers;

said address calculator calculating a predetermined address if the instruction in question is an instruction belonging to a second type of instruction that requires information for storing in said predetermined address, storing data stored in said predetermined address into said data buffer, setting the specific flag associated with said data buffer to valid, and setting the specific flag to invalid in response to the output of stored data.

* * * * *